(12) United States Patent
Mano et al.

(10) Patent No.: US 11,249,172 B2
(45) Date of Patent: Feb. 15, 2022

(54) IMAGE ACQUIRING APPARATUS FOR VEHICLE, CONTROL DEVICE, VEHICLE HAVING IMAGE ACQUIRING APPARATUS FOR VEHICLE OR CONTROL DEVICE, AND IMAGE ACQUIRING METHOD FOR VEHICLE

(71) Applicant: KOITO MANUFACTURING CO., LTD., Tokyo (JP)

(72) Inventors: Mitsuharu Mano, Shizuoka (JP); Takanori Namba, Shizuoka (JP); Osamu Endo, Shizuoka (JP); Masayasu Ito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 408 days.

(21) Appl. No.: 16/065,056

(22) PCT Filed: Dec. 1, 2016

(86) PCT No.: PCT/JP2016/085810
§ 371 (c)(1),
(2) Date: Jun. 21, 2018

(87) PCT Pub. No.: WO2017/110413
PCT Pub. Date: Jun. 29, 2017

(65) Prior Publication Data
US 2019/0004149 A1 Jan. 3, 2019

(30) Foreign Application Priority Data

Dec. 21, 2015 (JP) .................................. 2015-248820
Dec. 21, 2015 (JP) .................................. 2015-248822
Dec. 21, 2015 (JP) .............................. JP2015-248821

(51) Int. Cl.
*G01S 7/48* (2006.01)
*G01S 7/484* (2006.01)
(Continued)

(52) U.S. Cl.
CPC ............ *G01S 7/484* (2013.01); *G01S 7/4868* (2013.01); *G01S 17/18* (2020.01); *G01S 17/89* (2013.01); *G01S 7/4802* (2013.01); *G01S 17/931* (2020.01)

(58) Field of Classification Search
CPC .......... G01S 7/486; G01S 17/88; G01S 17/18; G01S 7/4802; G01S 17/931; G01S 17/50;
(Continued)

(56) References Cited

U.S. PATENT DOCUMENTS 3,895,388 A 7/1975 Townsend
5,029,009 A 7/1991 Ulich et al.
(Continued)

FOREIGN PATENT DOCUMENTS

CN 1345095 A 4/2002
CN 1744789 A 3/2006
(Continued)

OTHER PUBLICATIONS

Translation for JP2009257981A.*
(Continued)

*Primary Examiner* — Luke D Ratcliffe
(74) *Attorney, Agent, or Firm* — Osha Bergman Watanabe & Burton LLP

(57) ABSTRACT

An image acquiring apparatus for a vehicle includes a light emitting unit configured to emit pulse light to a predetermined direction, an image acquisition unit configured to acquire a plurality of different images of target distance ranges by imaging reflected light returning from the target distance ranges at imaging timings set according to the target
(Continued)

distance ranges, and a timing controller configured to control a light emission cycle of the pulse light and the imaging timings. The timing controller is configured to control at least one of the light emission cycle and the imaging timing such that among different target distance ranges, a range of a specific distance necessary for object recognition is imaged with luminance higher than that for ranges other than the range of the specific distance.

14 Claims, 20 Drawing Sheets

(51) Int. Cl.
*G01S 17/89* (2020.01)
*G01S 7/486* (2020.01)
*G01S 17/18* (2020.01)
*G01S 17/931* (2020.01)

(58) Field of Classification Search
CPC ........ G01S 17/89; G01S 17/08; G01S 17/894; G01S 17/86; G01S 7/484; G01S 7/48; G01S 7/4868; G06K 9/00805
See application file for complete search history.

(56) References Cited

U.S. PATENT DOCUMENTS

| | | |
|---|---|---|
| 5,118,180 A | 6/1992 | Wichmann et al. |
| 5,864,391 A | 1/1999 | Hosokawa et al. |
| 6,115,511 A | 9/2000 | Sakai et al. |
| 6,311,020 B1 | 10/2001 | Torikoshi |
| 7,956,988 B1 | 6/2011 | Moran |
| 10,203,399 B2 | 2/2019 | Retterath et al. |
| 2002/0039087 A1 | 4/2002 | Inukai |
| 2002/0051128 A1 | 5/2002 | Aoyama |
| 2002/0052711 A1 | 5/2002 | Aoyama |
| 2002/0149694 A1 | 10/2002 | Seo |
| 2003/0155513 A1* | 8/2003 | Remillard ............... G01S 17/18 250/341.8 |
| 2006/0050979 A1 | 3/2006 | Kawahara |
| 2006/0055244 A1 | 3/2006 | Ito et al. |
| 2006/0171703 A1 | 8/2006 | Abe et al. |
| 2006/0215040 A1 | 9/2006 | Sugawara |
| 2007/0058038 A1 | 3/2007 | David et al. |
| 2007/0200747 A1 | 8/2007 | Okai et al. |
| 2008/0007429 A1 | 1/2008 | Kawasaki et al. |
| 2008/0157678 A1 | 7/2008 | Ito et al. |
| 2009/0040500 A1 | 2/2009 | Nishiushi |
| 2010/0053365 A1 | 3/2010 | Abe et al. |
| 2010/0109938 A1 | 5/2010 | Oswald et al. |
| 2010/0181914 A1 | 7/2010 | Kasaba et al. |
| 2010/0207806 A1 | 8/2010 | Takahashi et al. |
| 2011/0091197 A1 | 4/2011 | Lee et al. |
| 2011/0311130 A1 | 12/2011 | Ichimori |
| 2012/0069176 A1 | 3/2012 | Park et al. |
| 2012/0075534 A1 | 3/2012 | Katz et al. |
| 2012/0200757 A1 | 8/2012 | Kasahara |
| 2012/0249781 A1 | 10/2012 | Vollmerhausen |
| 2012/0307230 A1 | 12/2012 | Dorrington et al. |
| 2012/0320219 A1 | 12/2012 | David et al. |
| 2013/0188022 A1 | 7/2013 | Katz et al. |
| 2014/0139133 A1 | 5/2014 | Kawasaki |
| 2015/0160340 A1 | 6/2015 | Grauer et al. |
| 2015/0202939 A1 | 7/2015 | Stettner et al. |
| 2016/0061952 A1 | 3/2016 | Tsuji et al. |
| 2016/0344965 A1 | 11/2016 | Grauer |
| 2016/0365846 A1 | 12/2016 | Wyland |
| 2017/0156673 A1 | 6/2017 | Uchida et al. |
| 2017/0212220 A1 | 7/2017 | Dahlmann |

FOREIGN PATENT DOCUMENTS

| | | |
|---|---|---|
| CN | 1765120 A | 4/2006 |
| CN | 1838731 A | 9/2006 |
| CN | 1977527 A | 6/2007 |
| CN | 101209691 A | 7/2008 |
| CN | 101324749 A | 12/2008 |
| CN | 101644887 A | 2/2010 |
| CN | 101784147 A | 7/2010 |
| CN | 102043224 A | 5/2011 |
| CN | 202305416 U | 7/2012 |
| CN | 102629972 A | 8/2012 |
| CN | 102737389 A | 10/2012 |
| CN | 102792333 A | 11/2012 |
| CN | 103744078 A | 4/2014 |
| DE | 60125683 T2 | 4/2007 |
| DE | 102009045600 A1 | 4/2011 |
| JP | S56164969 A | 12/1981 |
| JP | S59117981 U | 8/1984 |
| JP | S59198377 A | 11/1984 |
| JP | H04215089 A | 8/1992 |
| JP | H07043451 A | 2/1995 |
| JP | H07325152 A | 12/1995 |
| JP | H08065690 A | 3/1996 |
| JP | H09257927 A | 10/1997 |
| JP | H09274076 A | 10/1997 |
| JP | H10132932 A | 5/1998 |
| JP | 2000-172995 A | 6/2000 |
| JP | 2004-157061 A | 6/2004 |
| JP | 2005271836 A | 10/2005 |
| JP | 2007232498 A | 9/2007 |
| JP | 2007-271373 A | 10/2007 |
| JP | 2008033872 A | 2/2008 |
| JP | 2008070999 A | 3/2008 |
| JP | 2008298741 A | 12/2008 |
| JP | 2009-031165 A | 2/2009 |
| JP | 2009-092555 A | 4/2009 |
| JP | 2009-192359 A | 8/2009 |
| JP | 2009-257981 A | 11/2009 |
| JP | 2009-257983 A | 11/2009 |
| JP | 2009257981 A * | 11/2009 ............ G01S 17/89 |
| JP | 2009258015 A | 11/2009 |
| JP | 2010-066221 A | 3/2010 |
| JP | 2010048716 A | 3/2010 |
| JP | 2010054461 A | 3/2010 |
| JP | 2010061304 A | 3/2010 |
| JP | 2010256291 A | 11/2010 |
| JP | 2011013950 A | 1/2011 |
| JP | 2011136651 A | 7/2011 |
| JP | 2012-220366 A | 11/2012 |
| JP | 2013096905 A | 5/2013 |
| JP | 2013160585 A | 8/2013 |
| JP | 2013546222 A | 12/2013 |
| JP | 2015510586 A | 4/2015 |
| JP | 2015-135273 A | 7/2015 |
| WO | 2014097539 A1 | 6/2014 |
| WO | 2014178376 A1 | 11/2014 |
| WO | 2015/001550 A1 | 1/2015 |

OTHER PUBLICATIONS

Extended European Search Report issued in counterpart European Patent Application No. 16878306.6, dated Jul. 22, 2019 (7 pages).
International Search Report issued in PCT/JP2016/085810 dated Feb. 28, 2017 (9 pages).
Written Opinion issued in PCT/JP2016/085810 dated Feb. 28, 2017 (6 pages).
Office Action issued in Japanese Application No. 2017-557832, dated Jan. 5, 2021(16 pages).
Office Action issued in Japanese Application No. 2017-557832, dated Jun. 30, 2020 (18 pages).
Office Action issued in Chinese Application No. 201680075213.8, dated Jun. 3, 2021 (22 pages).
Office Action issued in Chinese Application No. 201680075214.2, dated Jun. 16, 2021 (25 pages).
Extended European Search Report issued in counterpart European Patent Application No. 16878307.4, dated Jul. 22, 2019 (7 pages).

(56) References Cited

OTHER PUBLICATIONS

International Search Report issued in PCT/JP2016/085811, dated Feb. 28, 2017 (5 pages).
Written Opinion issued in PCT/JP2016/085811, dated Feb. 28, 2017 (7 pages).
Office Action issued in corresponding Chinese Application No. 201680074554.3, dated Dec. 5, 2019 (14 pages).
Extended European Search Report issued in counterpart European Patent Application No. 16878309.0, dated Jul. 22, 2019 (7 pages).
Lin, D. et al.; "Color Range Images Captured by a Four-Phase CMOS Image Sensor"; IEEE Transactions On Electron Devices, vol. 58, No. 3, Mar. 2011, pp. 732-739 (8 pages).
International Search Report issued in PCT/JP2016/085813 dated Feb. 21, 2017 (4 pages).
Written Opinion issued in PCT/JP2016/085813 dated Feb. 21, 2017 (5 pages).
Office Action issued in Japanese Application No. 2017-557836, dated Oct. 13, 2020 (19 pages).
Office Action issued in Japanese Application No. 2017-557836, dated Jun. 30, 2020 (13 pages).
Extended European Search Report issued inn counterpart European Application No. 16878310.8, dated Jul. 22, 2019 (7 pages).
International Search Report issued in PCT/JP2016/085814 dated Feb. 28, 2017 (10 pages).
Written Opinion issued in PCT/JP2016/085814 dated Feb. 28, 2017 (7 pages).
Office Action issued in Japanese Application No. 2017-557837, dated Oct. 13, 2020 (13 pages).
Extended European Search Report issued in counterpart European Patent Application No. 16878311.6, dated Jul. 22, 2019 (6 pages).
International Search Report issued in PCT/JP2016/085815 dated Feb. 28, 2017 (9 pages).
Written Opinion of International Searching Authority issued in PCT/JP2016/085815 dated Feb. 28, 2017 (5 pages).
Office Action issued in corresponding Chinese Application No. 201680074579.3; dated Aug. 30, 2021 (18 pages).

* cited by examiner

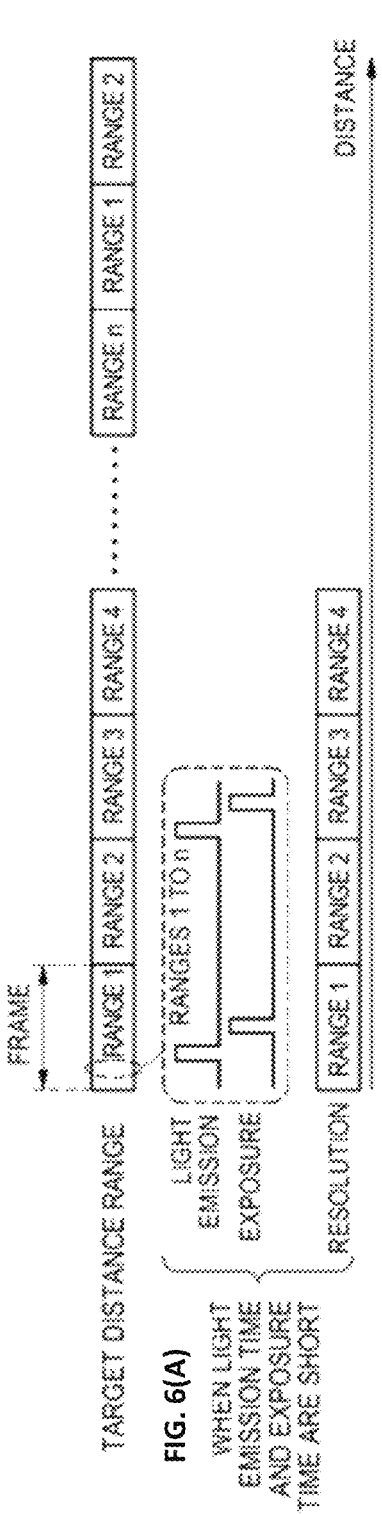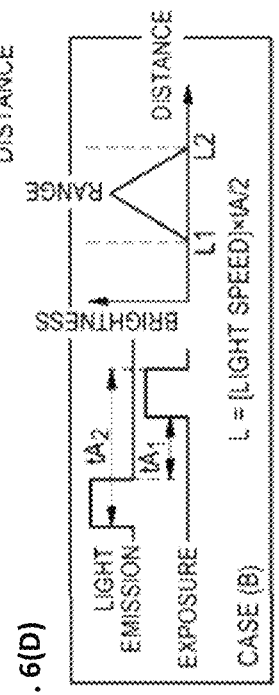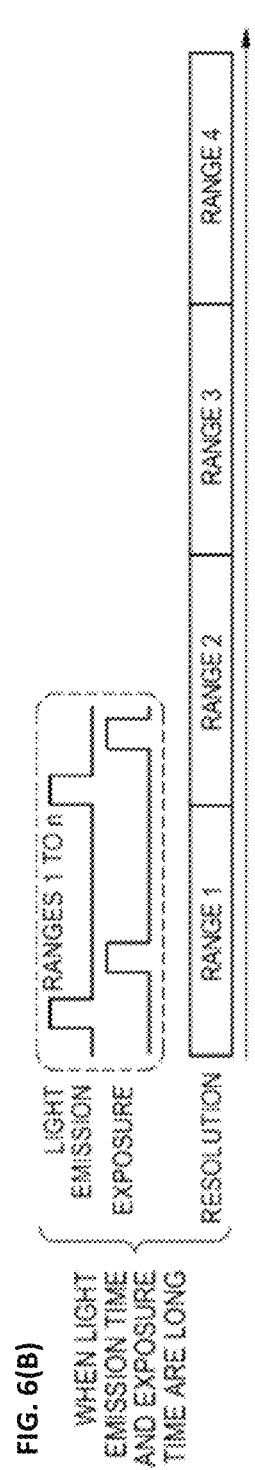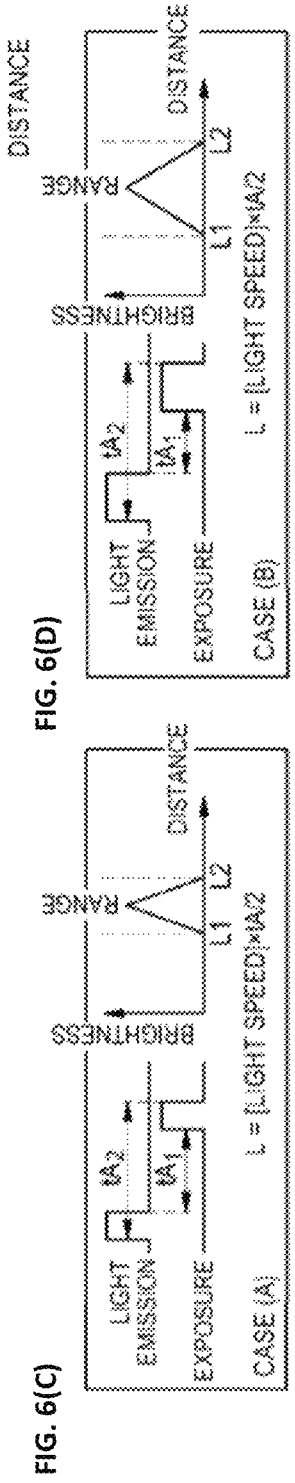
FIG. 6(A)
FIG. 6(B)
FIG. 6(C)
FIG. 6(D)

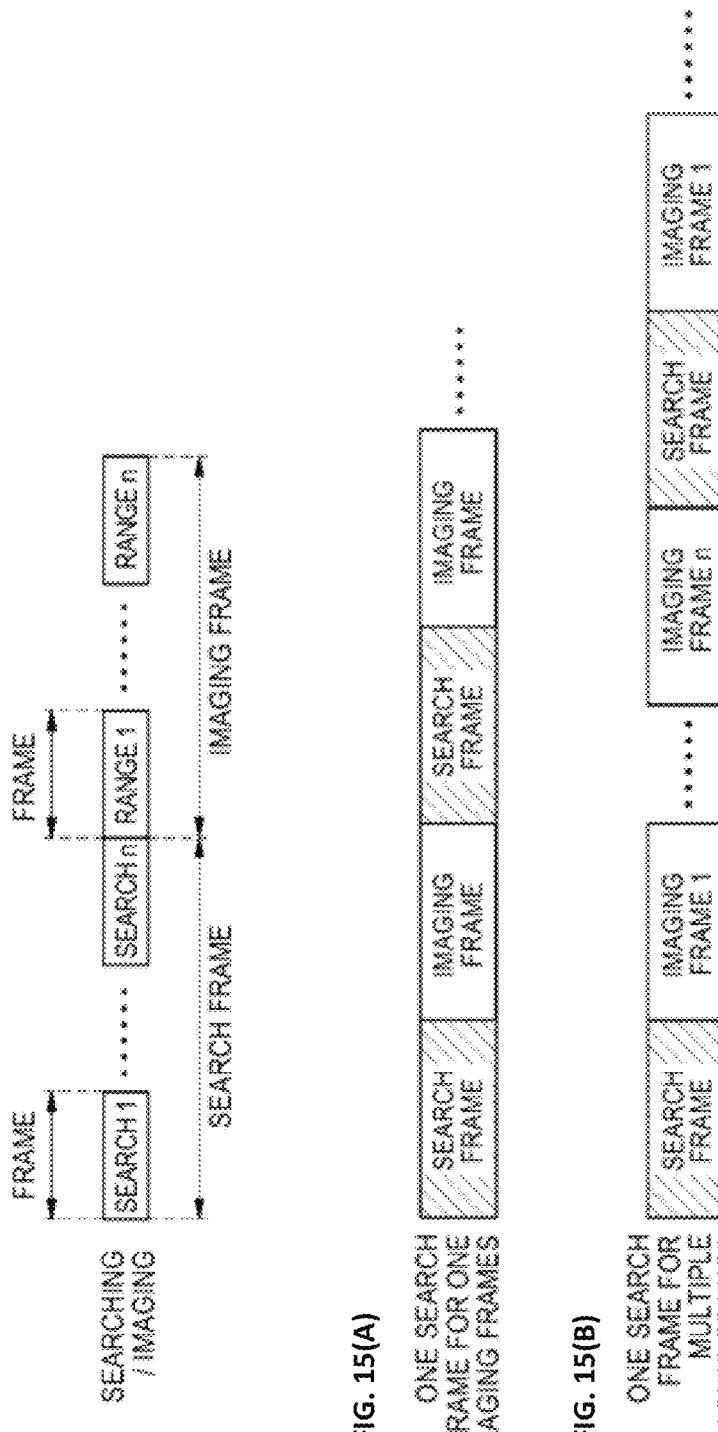
FIG. 15(A) ONE SEARCH FRAME FOR ONE IMAGING FRAMES
FIG. 15(B) ONE SEARCH FRAME FOR MULTIPLE IMAGING FRAMES

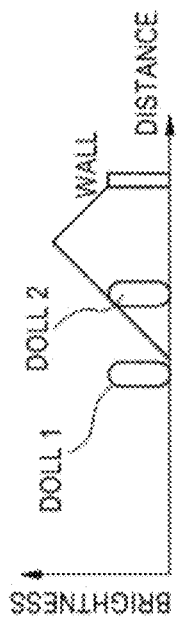 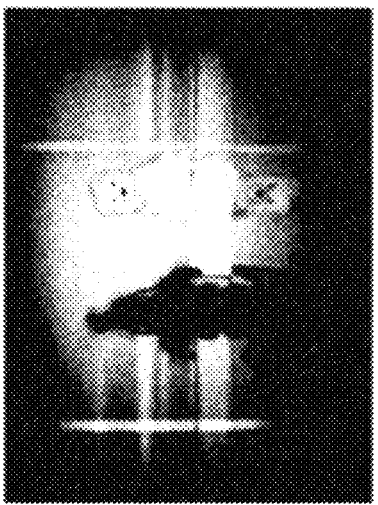
FIG. 16(A)
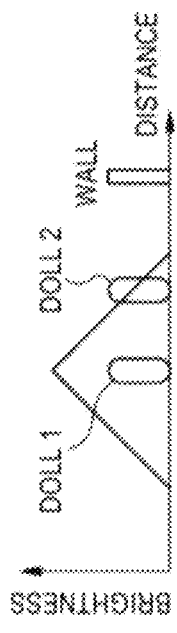 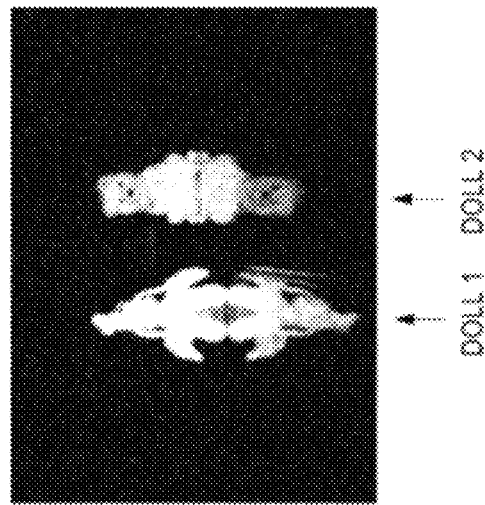
FIG. 16(B)

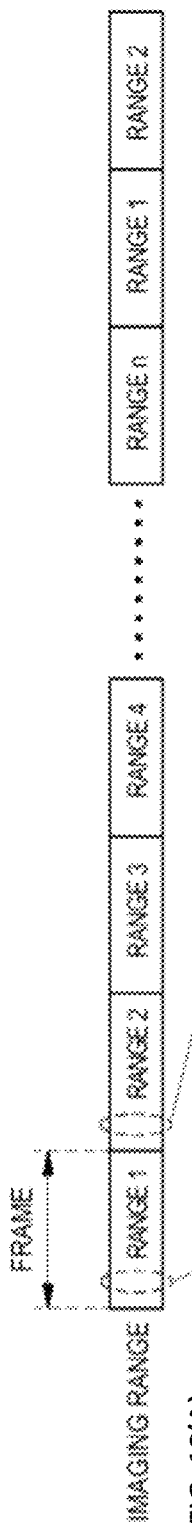
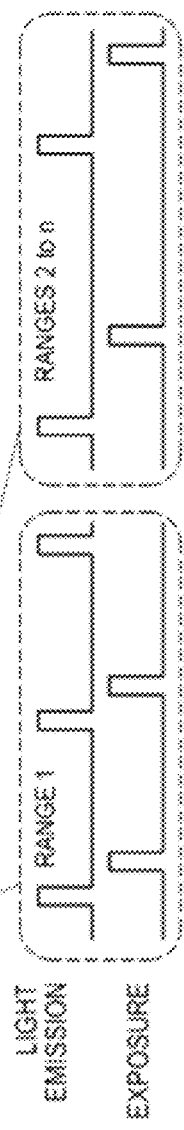
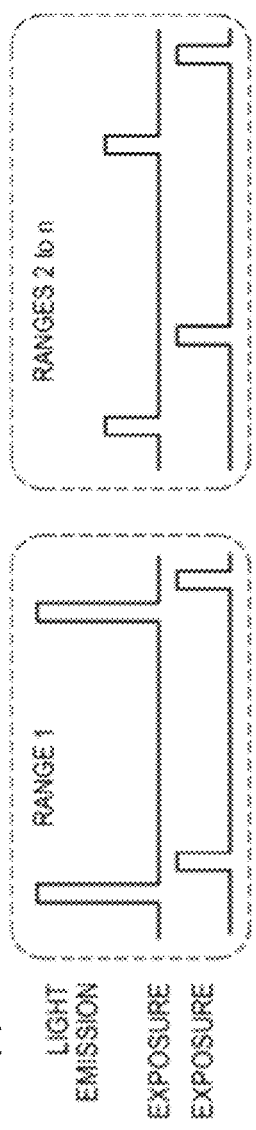
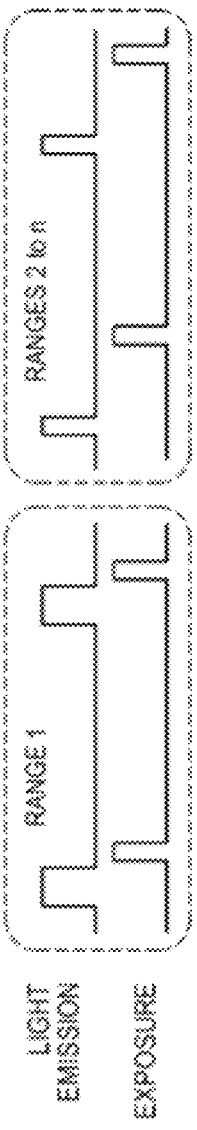
FIG. 18(A) FIG. 18(B) FIG. 18(C)

IMAGE ACQUIRING APPARATUS FOR VEHICLE, CONTROL DEVICE, VEHICLE HAVING IMAGE ACQUIRING APPARATUS FOR VEHICLE OR CONTROL DEVICE, AND IMAGE ACQUIRING METHOD FOR VEHICLE

BACKGROUND

This application claims priority to Japanese Patent Application No. 2015-248820 filed on Dec. 21, 2015, Japanese Patent Application No. 2015-248821 filed on Dec. 21, 2015, and Japanese Patent Application No. 2015-248822 filed on Dec. 21, 2015, the contents of which are incorporated herein by reference in their entirety.

TECHNICAL FIELD

This disclosure relates to an image acquiring apparatus for a vehicle, a control device, a vehicle having the image acquiring apparatus for a vehicle or the control device, and an image acquiring method for a vehicle.

RELATED ART

Patent Document 1 discloses a distance image data generating apparatus, which emits pulse light forward from a vehicle having the distance image data generating apparatus in a predetermined cycle and images the reflected light from target distances at imaging timings set according to the target distances, thereby acquiring a plurality of different images of the target distances, and generates distance image data representing the distance to an object of each pixel, based on the luminance of the same pixel in the images.

Patent Document 1: JP-A-2009-257983

SUMMARY OF THE INVENTION

In the distance image data generating apparatus for a vehicle disclosed in Patent Document 1, it is possible to increase the accuracy of distance detection by making target distance resolution finer while the light emission time of pulse light and the imaging (exposure) time of reflected light are shortened. However, as the light emission time and the imaging time are shortened, the luminance of acquired images is lower and object recognition becomes difficult. If the light emission intensity is simply increased or the light emission pulse width is simply lengthened, power consumption increases. Further, if the number of times of light emission and the number of times of exposure are simply increased, the frame rate becomes high, and the time required to exhaustively acquire images of all imaging ranges which are imaging targets becomes longer.

Also, in the distance image data generating apparatus for a vehicle disclosed in Patent Document 1, according to the light emission time of pulse light and the imaging (exposure) time of reflected light, distance resolution is determined. In order to increase the accuracy of distance detection, it is desirable that distance resolution be finer (a range width corresponding to one frame be shorter). Also, it is desirable to image all of target distance ranges (for example, 0 m to 200 m in front of the vehicle), which are distance ranges corresponding to desired imaging targets, bright with fine distance resolution. However, as distance resolution is finer, it takes more time to exhaustively acquire distance images of a desired imaging range and the cost of the apparatus increases.

Accordingly, one or more embodiments of the present invention provides an image acquiring apparatus for a vehicle, a control device, a vehicle having the image acquiring apparatus for a vehicle or the control device, and an image acquiring method for a vehicle, capable of improving the accuracy of recognition of objects in acquired images while maintaining fine distance resolution.

Also, one or more embodiments of the present invention provides an image acquiring apparatus for a vehicle, a control device, a vehicle having the image acquiring apparatus for a vehicle or the control device, and an image acquiring method for a vehicle, capable of preventing increase in the time required to exhaustively acquire distance images of a desired imaging range and in the cost while maintaining the accuracy of object recognition.

Further, one or more embodiments of the present invention provides an image acquiring method for a vehicle, an image acquiring apparatus for a vehicle, a control device, and a vehicle having the image acquiring apparatus for a vehicle or the control device for intensively imaging distance ranges of target distance ranges in which an object exists.

In one or more embodiments of the present invention, an image acquiring apparatus for a vehicle according to this disclosure includes: a light emitting unit configured to emit pulse light to a predetermined direction; an image acquisition unit configured to acquire a plurality of different images of target distance ranges by imaging reflected light returning from the target distance ranges at imaging timings set according to the target distance ranges; and a timing control unit configured to control a light emission cycle of the pulse light and the imaging timings, wherein the timing control unit is configured to control at least one of the light emission cycle and the imaging timings such that among different target distance ranges, a range of a specific distance necessary for object recognition is imaged with luminance higher than that for ranges other than the range of the specific distance.

According to the above-described configuration, by imaging only the range of the specific distance necessary for object recognition with high luminance (bright), the luminance contrast between the image of the range of the specific distance where an object may exist and the images of the ranges other than the range of the specific distance becomes clear. Therefore, recognition of an object in the range of the specific distance becomes easy. Therefore, it is possible to improve the accuracy of recognition of objects in the image while maintaining fine distance resolution, and thus it is possible to improve light control and vehicle control.

When it is bad weather or night, the range of the specific distance may be a range closest to the image acquisition unit among the target distance ranges.

According to the above-described configuration, by bright imaging the range which is closest to the image acquisition unit and to which most attention should be paid, it is possible to improve the accuracy of recognition of objects and contribute to safe driving in rainy weather or at night.

The range of the specific distance may be a range from which a recognition candidate object is detected among the target distance ranges.

According to the above-described configuration, by performing detection of objects which are recognition candidates in advance, it is possible to improve the accuracy of recognition of objects.

When there are a plurality of ranges from which the recognition candidate object is detected, the range of the specific distance may be set to a range closest to the image acquisition unit among the plurality of ranges.

According to the above-described configuration, when there are a plurality of recognition candidate objects, by bright imaging an object closest to the image acquisition unit, it is possible to improve the accuracy of recognition of an object which should be given most attention.

The timing control unit may be configured to set a number of times of light emission of the pulse light and a number of times of exposure of the image acquisition unit for the range of the specific distance larger than those for the ranges other than the range of the specific distance.

According to the above-described configuration, by increasing the number of times of light emission and the number of times of exposure only for the range of the specific distance, it is possible to improve the accuracy of recognition of objects without unnecessarily increasing power consumption and without unnecessarily increasing the frame rate.

The light emitting unit may be controlled such that a light emission intensity of the pulse light for the range of the specific distance becomes higher than that for the ranges other than the range of the specific distance.

According to the above-described configuration, by increasing the light emission intensity only for the range of the specific distance, it is possible to improve the accuracy of recognition of objects without unnecessarily increasing power consumption.

The timing control unit may be configured to lengthen a light emission time of the pulse light while shortening an exposure time of the image acquisition unit for the range of the specific distance as compared to the ranges other than the range of the specific distance.

According to the above-described configuration, by lengthening the light emission time while shortening the exposure time only for the range of the specific distance, it is possible to improve the accuracy of recognition of objects while maintaining fine distance resolution.

Also, in one or more embodiments of the present invention, a control device according to this disclosure is a control device for controlling an image acquiring apparatus for a vehicle which includes a light emitting unit configured to emit pulse light to a predetermined direction, and an image acquisition unit configured to acquire a plurality of different images of target distance ranges by imaging reflected light returning from the target distance ranges at imaging timings set according to the target distance ranges, and is configured to control at least one of a light emission cycle of the pulse light and the imaging timings such that a range of a specific distance necessary for object recognition among different target distance ranges is imaged with luminance higher than that for ranges other than the range of the specific distance.

According to the above-described configuration, since recognition of objects in the range of the specific distance becomes easy, it is possible to improve the accuracy of recognition of objects in the image while maintaining fine distance resolution, and thus it is possible to improve light control and vehicle control.

Also, one or more embodiments of the present invention, an image acquiring method for a vehicle according to this disclosure is an image acquiring method for a vehicle which acquires a plurality of different images of target distance ranges by imaging reflected light of pulse light emitted to a predetermined direction while changing imaging timings and includes controlling at least one of a light emission cycle of the pulse light and the imaging timings such that a range of a specific distance necessary for object recognition among different target distance ranges is imaged with luminance higher than that for ranges other than the range of the specific distance.

According to the above-described configuration, it is possible to improve the accuracy of recognition of objects in the image while maintaining fine distance resolution.

In one or more embodiments of the present invention, an image acquiring apparatus for a vehicle according to this disclosure includes: a light emitting unit configured to emit pulse light to a predetermined direction; an image acquisition unit configured to acquire a plurality of different images of target distances by imaging reflected light returning from the target distance ranges at imaging timings set according to the target distance ranges; and a timing control unit configured to control the light emission cycle of the pulse light and the imaging timings, wherein the timing control unit is configured to control at least one of the light emission cycle and the imaging timings such that among different target distance ranges, a range of a target road environment is imaged more intensively than ranges other than the range of the target road environment are.

According to the above-described configuration, by intensively imaging only the range of the target road environment, it is possible to grasp the distances to objects with high accuracy, and it is possible to prevent increase in the time required to exhaustively acquire images of a desired imaging range and the cost. Also, since the luminance contrast between the range of the target road environment and the other ranges becomes clear, recognition of recognition candidate objects in the target road environment becomes easy. Therefore, it is possible to improve light control and vehicle control.

The target road environment may include an intersection or a curve and may be acquired from map information.

According to the above-described configuration, by acquiring an intersection or a curve where accidents are likely to occur from map information and intensively imaging the intersection or the curve, it is possible to reduce traffic accidents.

The timing control unit may be configured to set the light emission cycle of the pulse light and an exposure time of the image acquisition unit for the range of the target road environment shorter than those for ranges other than the range of the target road environment.

According to the above-described configuration, by shortening the light emission time and the exposure time for the range of the target road environment, it is possible to improve the distance resolution of the range of the target road environment.

The timing control unit may be configured to lengthen a light emission time of the pulse light while shortening an exposure time of the acquisition unit for the range of the target road environment as compared to the ranges other than the range of the target road environment.

According to the above-described configuration, it is possible to image the range of the target road environment bright, and it is possible to improve the accuracy of recognition of objects.

The timing control unit may be configured to set a light emission intensity of the pulse light for the range of the target road environment higher than that for the ranges other than the range of the target road environment.

According to the above-described configuration, it is possible to image the range of the target road environment bright, and it is possible to improve the accuracy of recognition of objects.

Also, one or more embodiments of the present invention, a control device of this disclosure is a control device for controlling an image acquiring apparatus for a vehicle which includes a light emitting unit configured to emit pulse light to a predetermined direction, and an image acquisition unit configured to acquire a plurality of different images of target distance ranges by imaging reflected light returning from the target distance ranges at imaging timings set according to the target distance ranges, and is configured to control at least one of a light emission cycle and the imaging timings such that among different target distance ranges, a range of a target road environment is imaged more intensively than ranges other than the range of the target road environment are.

According to the above-described configuration, by intensively imaging only the range of the target road environment, it is possible to grasp the distances to objects with high accuracy, and recognition of recognition candidate objects in the target road environment becomes easy.

Also, one or more embodiments of the present invention, an image acquiring method for a vehicle according to this disclosure is an image acquiring method for a vehicle which acquires a plurality of different images of target distance ranges by imaging reflected light of pulse light emitted to a predetermined direction while changing imaging timings, and includes controlling at least one of a light emission cycle of the pulse light and the imaging timings such that among different target distance ranges, a range of a target road environment is imaged more intensively than ranges other than the range of the target road environment are.

According to the above-described configuration, by intensively imaging only the range of the target road environment, it is possible to grasp the distances to objects with high accuracy, and recognition of recognition candidate objects in the target road environment becomes easy.

In one or more embodiments of the present invention, an image acquiring method for a vehicle according to this disclosure is an image acquiring method for a vehicle which includes emitting pulse light to a predetermined direction in a predetermined cycle while changing imaging timings, acquiring a plurality of different images of target distances by imaging reflected light returning from target distance ranges at imaging timings set according to the target distance ranges, and further includes searching existence or non-existence of an object before emitting the pulse light.

According to the above-described configuration, since the step of searching existence or non-existence of objects is provided in advance, in the step of emitting the pulse light and the step of imaging the reflected light of the pulse light, it is possible to intensively image a distance range where an object exists among the target distance ranges. Therefore, it is possible to improve the accuracy of object recognition while preventing increase in the time required to exhaustively acquire images of the target distance ranges and the cost.

The step of searching existence or non-existence of an object may include providing a search frame for searching existence or non-existence of an object and a distance thereof before an imaging frame for imaging predetermined distance ranges changing continuously.

According to the above-described configuration, it is possible to search existence or non-existence of an object before the image acquiring process by an easy method.

The step of searching existence or non-existence of an object may include: dividing the target distance ranges into a close range close to the own vehicle and a far range far from the own vehicle; setting the far range as a first search range; determining whether an image of the far range acquired by imaging reflected light from the far range includes a predetermined image area; and detecting a distance of an object closest to the own vehicle by determining a next search range according to existence or non-existence of the predetermined image area.

According to the above-described configuration, it is possible to search an object existing at the shortest distance by a small number of frames.

The predetermined image area may include a pixel area having a luminance value equal to or smaller than a threshold.

According to the above-described configuration, it is possible to search existence or non-existence of an object by a simple process.

The step of searching existence or non-existence of an object may include narrowing a distance range where an object exists by emitting the pulse light a plurality of times or imaging the reflected light a plurality of times.

According to the above-described configuration, it is possible to search an object existing at the shortest distance by a small number of frames.

Also, in order to achieve the third object, an image acquiring apparatus for a vehicle according to this disclosure includes: a light emitting unit configured to emit pulse light to a predetermined direction; an image acquisition unit configured to acquire a plurality of different images of target distances by imaging reflected light returning from the target distances at imaging timings set according to the target distances; a timing control unit configured to control a light emission cycle of the pulse light and the imaging timings; and a search process control unit configured to search existence or non-existence of an object before the light emitting unit emits the pulse light.

According to the above-described configuration, by searching existence or non-existence of an object in advance, it is possible to intensively image a distance range where an object exists among the target distance ranges. Therefore, it is possible to improve the accuracy of object recognition while preventing increase in the time required to exhaustively acquire distance images of the target distance ranges and the cost.

Also, one or more embodiments of the present invention, a control device of this disclosure is a control device for controlling an image acquiring apparatus for a vehicle which includes a light emitting unit configured to emit pulse light to a predetermined direction, and an image acquisition unit configured to acquire a plurality of different images of target distance ranges by imaging reflected light returning from the target distance ranges at imaging timings set according to the target distance ranges, and includes a search process control unit configured to search existence or non-existence of an object before the light emitting unit emits the pulse light.

According to the above-described configuration, by searching existence or non-existence of an object in advance, it is possible to intensively image a distance range where an object exists among the target distance ranges, and it is possible to improve the accuracy of object recognition while preventing increase in the time required to exhaustively acquire distance images of the target distance ranges and the cost.

Also, one or more embodiments of the present invention, a vehicle of this disclosure includes the image acquiring apparatus for a vehicle or the control device described above.

According to the above-described configuration, it is possible to improve the safety of a vehicle having, for example, a self-driving system.

According to one or more embodiments of the present invention, it is possible to improve the accuracy of recognition of objects in acquired images while maintaining fine distance resolution.

Also, according to one or more embodiments of the present invention, it is possible to prevent increase in the time required to exhaustively acquire images of a desired imaging range while improving the accuracy of object recognition.

BRIEF DESCRIPTION OF DRAWINGS

FIGS. 6(A)-6(C) are views for explaining the relationship between light-emission/exposure time and distance resolution.

FIGS. 15(A)-15(B) are views illustrating an object search method according to a seventh example.

FIGS. 16(A)-16(B) show schematic diagrams of imaging of a specific distance and acquired images, according to the seventh example, wherein FIG. 16(A) shows a schematic diagram of the case where there is no object at a distance shorter than the specific distance and an acquired image, and FIG. 16(B) shows a schematic diagram of the case where there is an object at a distance shorter than the specific distance and an acquired image.

FIGS. 18(A)-18(C) are views illustrating examples of light emission cycles and imaging timings according to the seventh example.

DETAILED DESCRIPTION

Hereinafter, embodiments of the invention will be described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
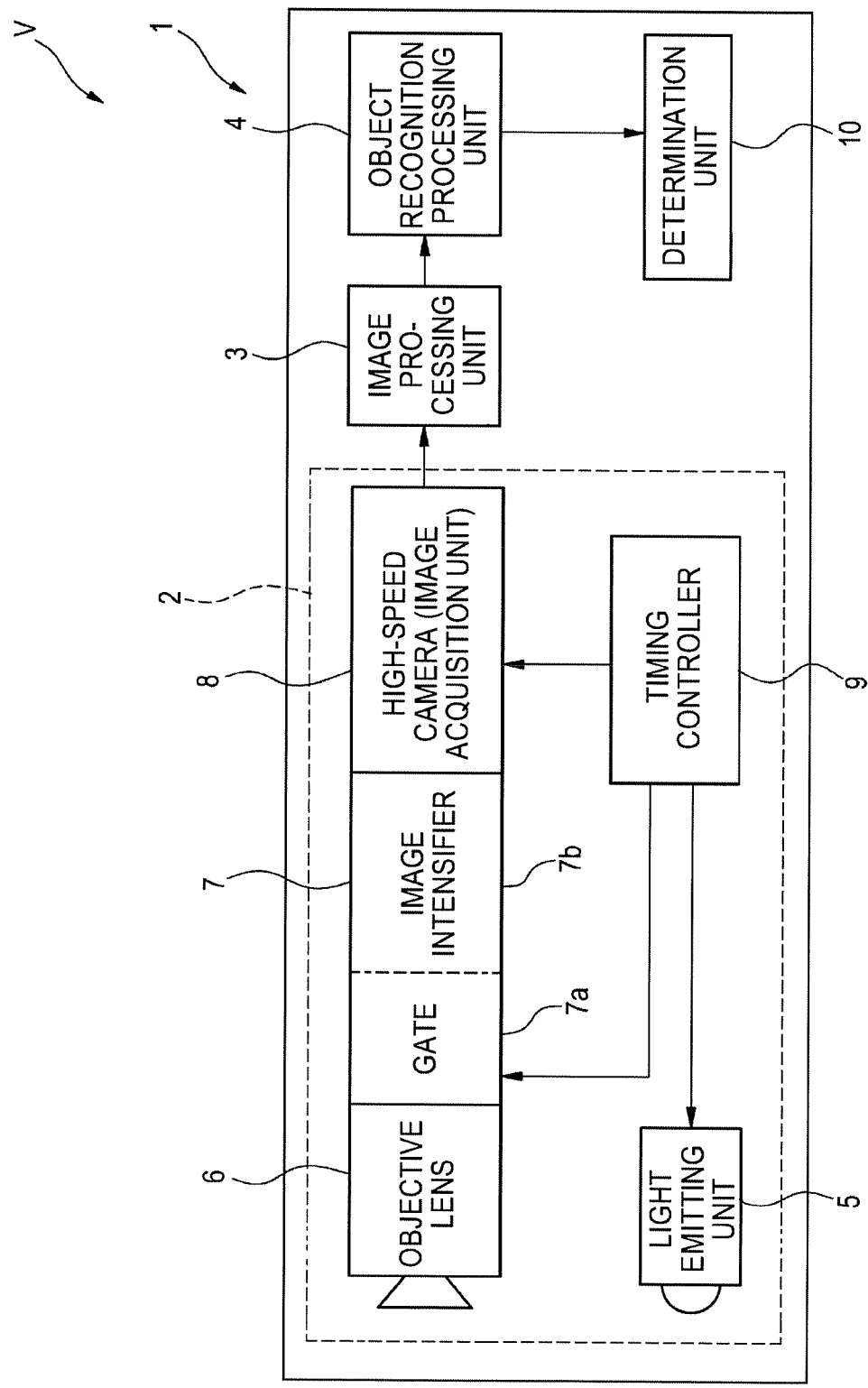
FIG. 1 is a block diagram illustrating the configuration of an obstacle detecting apparatus according to one or more embodiments of the present invention.
Figure 2:
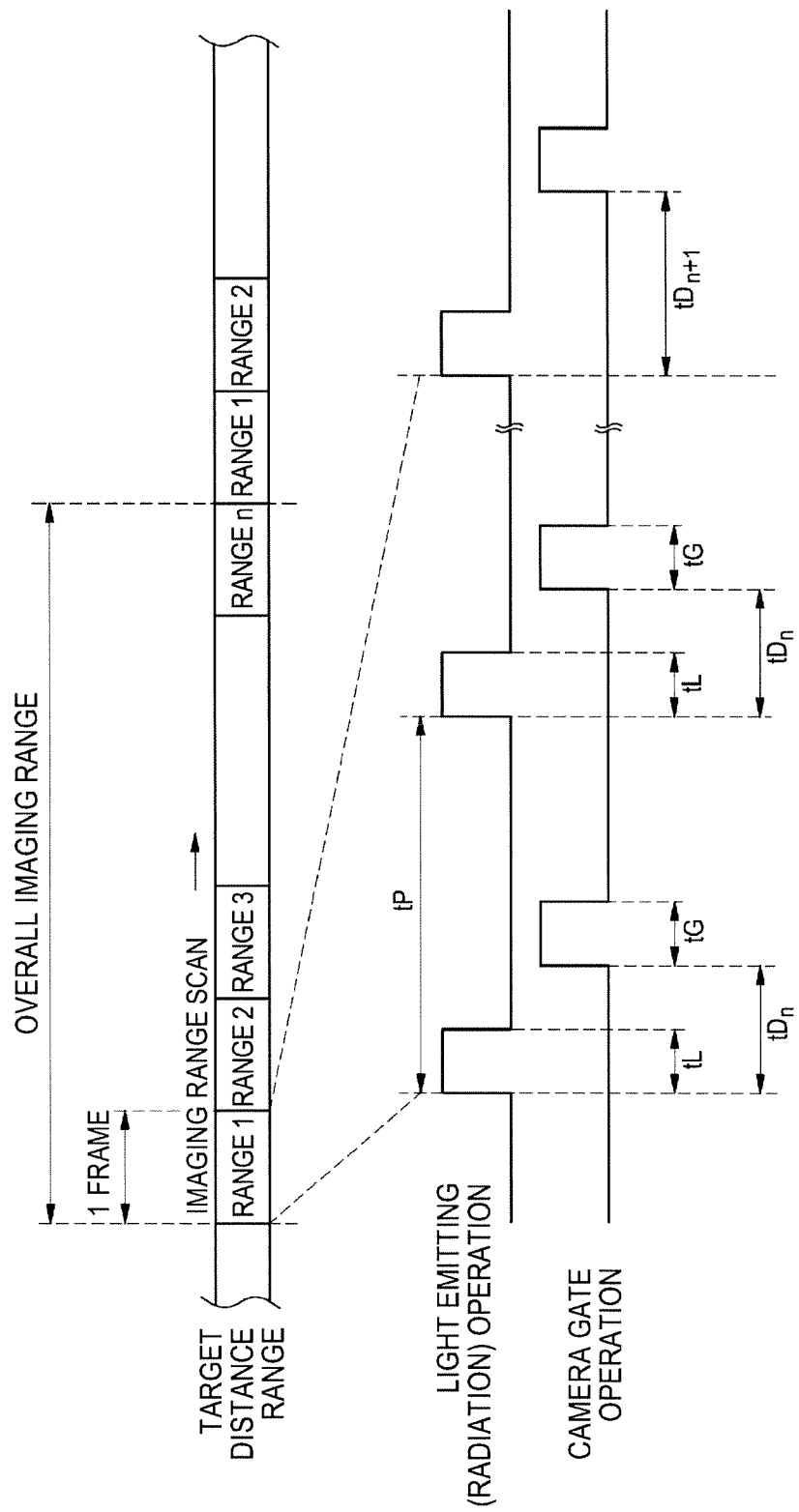
FIG. 2 is a view illustrating the temporal relationship between an operation (light emitting operation) of a light emitting unit and an operation (camera gate operation) of a gate when imaging respective target distance ranges.

FIG. 1 is a block diagram illustrating the configuration of an obstacle detecting apparatus according to one or more embodiments of the present invention using an image acquiring apparatus for a vehicle. FIG. 2 is a schematic diagram illustrating the temporal relationship between an operation (light emitting operation) of a light emitting unit and an operation (camera gate operation) of a gate when imaging respective target distance ranges.

As shown in FIG. 1, an obstacle detecting apparatus 1 which is installed in a vehicle V (the own vehicle) includes an image acquiring apparatus 2, an image processing unit (a distance image data generating unit) 3, an object recognition processing unit 4, and a determination unit 10.

The image acquiring apparatus 2 includes a light emitting unit 5, an objective lens 6, a light intensifying unit 7, a high-speed camera (an image acquisition unit) 8, and a timing controller (a timing control unit) 9.

The light emitting unit 5 is, for example, a near-infrared LED disposed at a front end part of the vehicle V. As shown in FIG. 2, the light emitting unit 5 emits pulse light to a predetermined direction (for example, forward from the vehicle V) for a predetermined light emission time tL (for example, 5 ns), according to a pulse signal output from the timing controller 9. The light emission cycle tP of pulse light which is radiated from the light emitting unit 5 is set to, for example, an interval of 10 μs or less.

The objective lens 6 is, for example, an optical system set so as to have such an angle of field that it is possible to image a predetermined range in front of the vehicle V, and receives reflected light from objects. The objective lens 6 may be disposed close to the light emitting unit 5 or may be disposed apart from the light emitting unit.

The light intensifying unit 7 includes a gate 7a and an image intensifier 7b. The gate 7a is opened and closed according to an opening/closing command signal from the timing controller 9. In one or more embodiments of the present invention, an opening time (gate time) tG of the gate 7a is set to 5 ns similarly to the light emission time tL. The gate time tG is proportional to the imaging object length (imaging object depth) of each range (target distance range) of an overall imaging range from a range 1 to a range n. As the gate time tG is lengthened, the imaging object length of each range lengthens. The imaging object length is obtained from the product of light speed and the gate time tG, and in one or more embodiments of the present invention, since the gate time tG is 5 ns, the imaging object length becomes 1.5 m from the product of light speed (about $3\times10^8$ m/s) and the gate time (5 ns).

The image intensifier 7b is a device for first converting very weak light (such as reflected light from objects) into electrons, and electrically amplifying them, and converting them back into a fluorescent image, thereby doubling the amount of light, such that it is possible to see an image with clear contrast. Light amplified by the image intensifier 7b is guided to an image sensor of the high-speed camera 8.

The high-speed camera 8 images the image output from the light intensifying unit 7, according to a command signal from the timing controller 9, and outputs the acquired image to the image processing unit 3. In one or more embodiments of the present invention, a camera having a resolution of 640×480 (transverse: longitudinal), luminance values 1 to 255 (256 levels), and a frame rate of 100 fps or more is used.

The timing controller 9 controls imaging timings by setting a delay time tD (in FIG. 2, $tD_n$, $tD_{n+1}$) which is a time from when the light emitting unit 5 starts to emit light to when the gate 7a is opened such that the timing when an image is acquired by the high-speed camera 8 becomes the timing of reflected light returning from a target distance range which is a target imaging range and outputting opening/closing command signals according to the delay time tD. In other words, the delay time tD is a value to determine the distance (an imaging object distance) from the vehicle V to the target distance range. The relationship between the delay time tD and the imaging object distance is obtained from the following Expression (1).

$$\text{Imaging Object Distance} = \text{Light Speed (about } 3\times10^8 \text{ m/s)} \times \text{Delay Time tD}/2 \quad (1)$$

The timing controller 9 changes the image range of the high-speed camera 8 forward from the vehicle 100 by repeatedly lengthening the delay time tD by a predetermined interval (for example, 10 ns) such that the target distance range continuously goes forward (away) from the vehicle V. Also, the timing controller 9 performs control such that the imaging operation of the high-speed camera 8 starts immediately before the gate 7a is opened and the imaging operation finishes after the gate 7a is completely closed.

The timing controller 9 controls the light emitting unit 5, the gate 7a, and the high-speed camera 8 such that they perform a plurality of times of light emission and exposure for each of preset target distance ranges (each range of the range 1, the range 2, . . . , and the range n). Light which the high-speed camera 8 has received is converted into electric charge, and a plurality of times of light emission and exposure is repeated, whereby the electric charge is accumulated. One image which is acquired every predetermined charge accumulation time is called a frame. However, the high-speed camera 8 may acquire one image (one frame) for each target distance range, or may acquire a plurality of images (several frames) for each target distance range. In the above-mentioned way, the high-speed camera 8 acquires a plurality of different images of target distance ranges, and outputs the plurality of acquired images to the image processing unit 3.

The image processing unit 3 generates distance image data representing the distances to objects (subjects) of respective pixels, based on the luminance of the same pixels in images of all imaging ranges acquired by the high-speed camera 8, and outputs the generated distance image data to the object recognition processing unit 4.

The object recognition processing unit 4 specifies objects included in the distance image data. As the object specifying method, a well-known technology such as pattern mapping can be used.

The determination unit 10 determines the relationship (such as distances and directions) between the vehicle (the vehicle V) and the objects (such as persons, vehicles, and signs) specified by the object recognition processing unit 4.

Next, an image acquiring operation according to one or more embodiments of the present invention will be described.

[Image Acquiring Operation]

The timing controller 9 sets the delay time tD such that the timing when an image which is acquired by the high-speed camera 8 becomes the timing of reflected light returning from a predetermined target distance range, thereby controlling imaging timings of the high-speed camera 8. In the case where there is any object in a target distance range, the time required for light emitted from the light emitting unit 5 to return from the target distance range becomes the time required for the light to travel out and back over the distance (imaging object distance) between the vehicle V and the target distance range. Therefore, the delay time tD can be obtained from the imaging object distance and the light speed.

In an image of the high-speed camera 8 acquired by the above-mentioned method, in the case where there is an object in the target distance range, luminance value data of pixels corresponding to the location of the corresponding object are influenced by the reflected light, and thus represent values higher than luminance value data of the other pixels. Therefore, it is possible to obtain the distance to the object existing in the target distance range, based on the luminance value data of the respective pixels.

Figure 3:
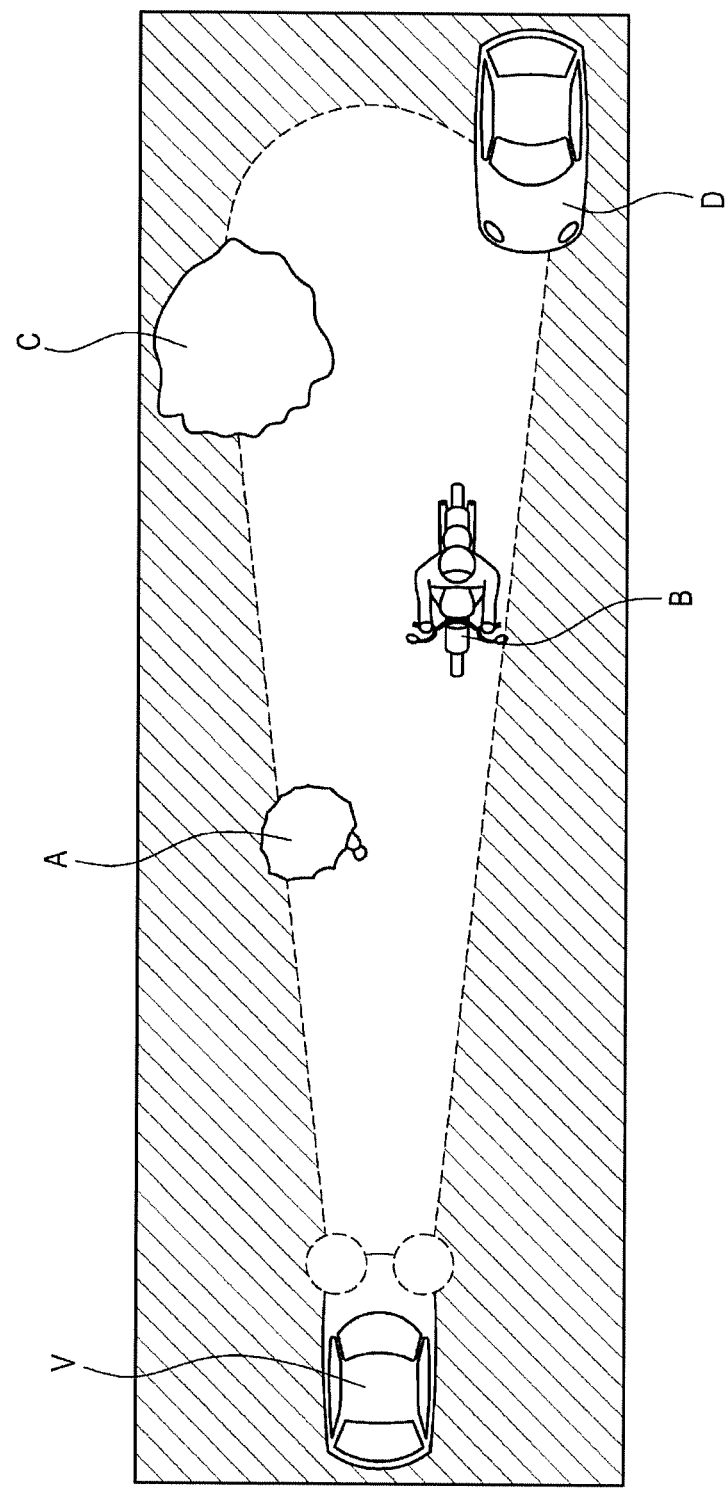
FIG. 3 is a view illustrating a situation where four different objects exist at different positions in front of the own vehicle.

FIG. 3 shows a situation where four objects A to D exist at different locations in front of the vehicle V. The object A is a person holding an umbrella, and the object B is a motorcycle on the oncoming lane side, and the object C is a tree on the sidewalk side, and the object D is a vehicle (an oncoming vehicle) on the oncoming lane side. It is assumed that the relationship of the distances between the vehicle V and the respective objects is A<B<C<D.

Figure 4:
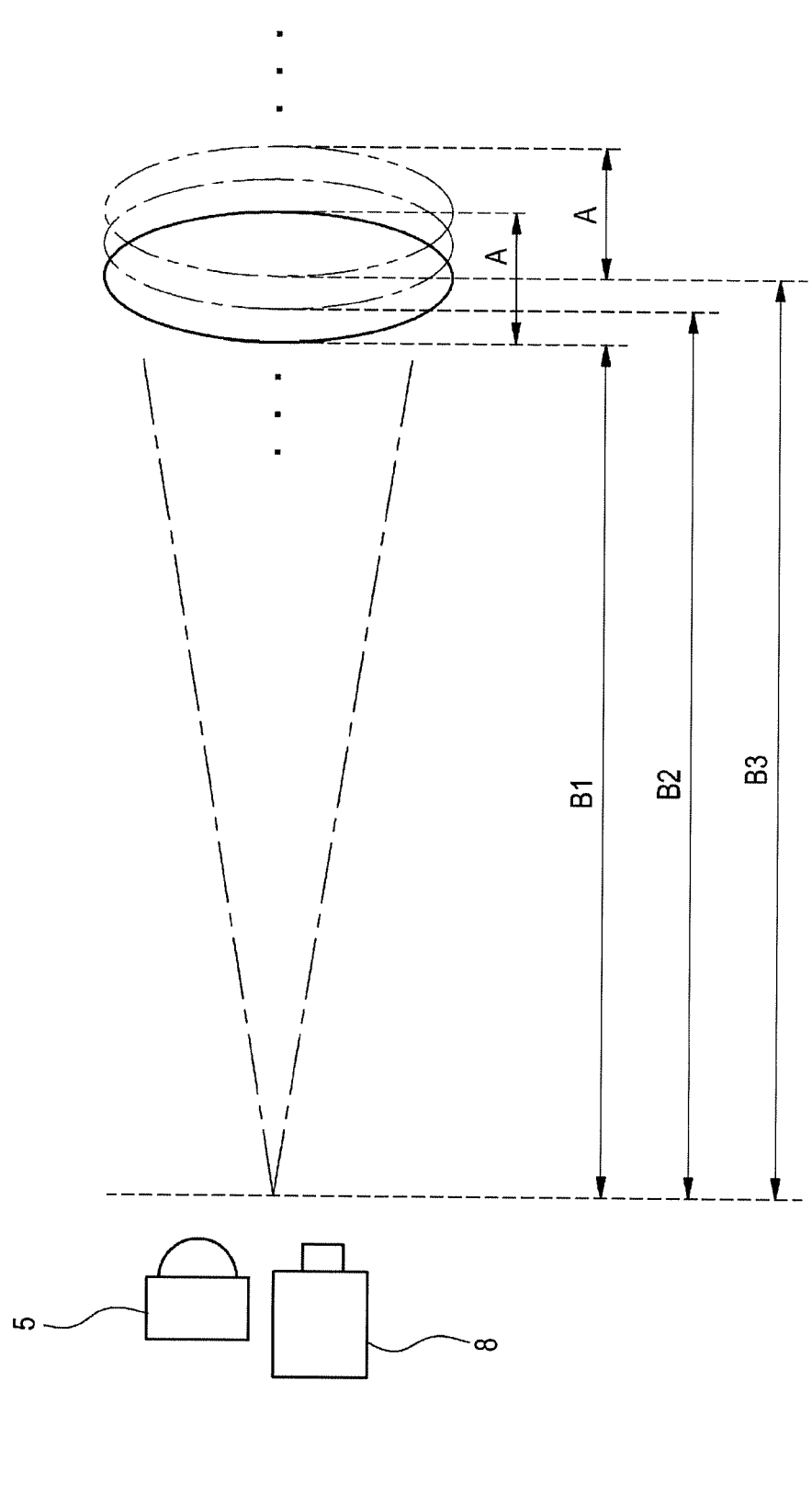
FIG. 4 is a view illustrating a state where imaging ranges partially overlap.

In this case, in one or more embodiments of the present invention, imaging ranges are partially overlapped such that reflected light from one object is reflected in pixels of images of a plurality of continuous imaging ranges. In other words, as shown in FIG. 4, in the case of acquiring images while continuously changing the imaging object distance in the order of B1, B2, B3, . . . , by setting the increment (B2−B1) in the imaging object distance shorter than an imaging object length A of each imaging range, the increment in the imaging object distance is set such that imaging ranges change while partially overlapping.

Figure 5:
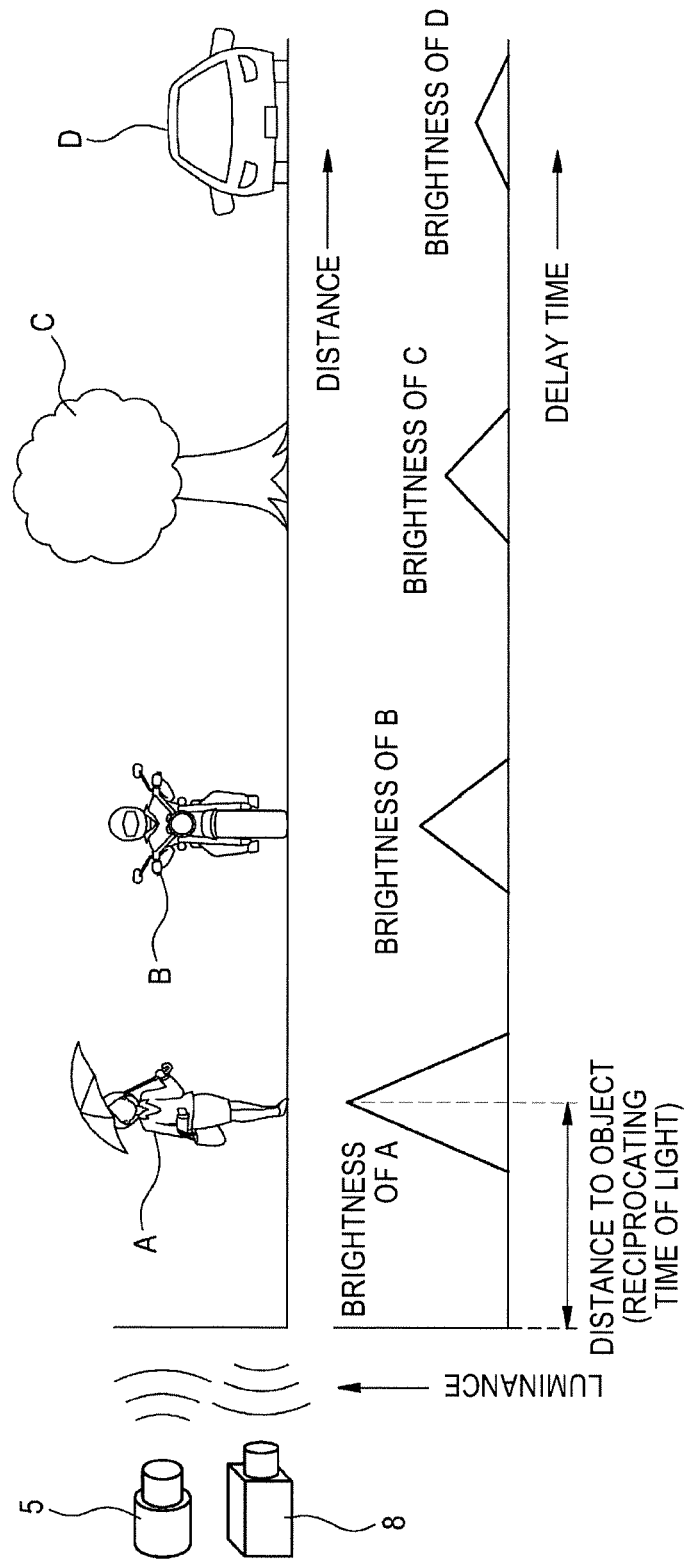
FIG. 5 is a schematic diagram illustrating temporal luminance variations in pixels corresponding to respective objects.

FIG. 5 shows temporal luminance variations in pixels corresponding to the respective objects.

Since the imaging ranges are partially overlapped, as shown in FIG. 5, the luminance values of the same pixels in the plurality of consecutive images represent features having triangular wave shapes in which the luminance values gradually increases and have peaks at the positions of the respective objects A to D and gradually decrease. That is, since the increment is set such that reflected light from one object is reflected in a plurality of images, the temporal luminance variations in the pixels have the triangular wave shapes. Therefore, if imaging ranges corresponding to the peaks of the triangular wave shapes are set at the distances from the vehicle V to the respective objects (subjects) A to D in the pixels, it is possible to improve detection accuracy.

Also, the obstacle detecting apparatus 1 having the image acquiring apparatus 2 according to one or more of the above-described embodiments can be used for light distribution control of a so-called AHB (automatic high beam) system and an ADB (adaptive driving beam) system. By using the obstacle detecting apparatus 1 together with another camera sensor mounted on the vehicle V, for example, existence or non-existence of objects in front of the vehicle V and the distances to objects are detected from a plurality of different images of target distance ranges acquired by the image acquiring apparatus 2, and an image of an area in front of the vehicle V is acquired by the another camera sensor. It is possible to obtain the distance of each light spot in the image acquired by the camera sensor from the images acquired by the image acquiring apparatus 2, and from the distance, the luminance, the shape (the shapes of the light spot and the periphery thereof), time-series variation, and so on of each light spot, it is possible to determine whether the light spot corresponds to a vehicle. That is, by using the image acquiring apparatus 2 and another camera sensor together, it is possible to perform detection of distant vehicles with high accuracy at high speed, and it is possible to suitably perform light distribution control of an AHB system or an ADB system.

FIRST EXAMPLE

FIGS. 6(A)-6(C) are views for explaining the relationship between light-emission/exposure time and distance resolution. FIG. 6 (A) shows distance resolution in the case where the pulse width (light emission time) of pulse light and the gate time (exposure time) of the high-speed camera are comparatively short. Meanwhile, FIG. 6(B) shows distance resolution in the case where the pulse width (light emission time) of pulse light and the gate time (exposure time) of the high-speed camera are longer than the pulse width and the gate time of FIG. 6(A), respectively. Also, FIG. 6(C) and FIG. 6(D) show the relationships between light-emission/exposure time and imaging object distance.

As described above, imaging object distance L is obtained from [Light Speed]×[Delay Time tD (Time tA of FIG. 6(C) and FIG. 6(D))]/2. In other words, a time $tA_1$ from a light emission end time point of pulse light to an exposure start time point corresponds to a distance L1, and a time $tA_2$ from a light emission start time point of pulse light to an exposure end time point corresponds to a distance L2. Therefore, as the light emission time and the exposure time shorten as shown in FIG. 6(A), an imaging object length (L2−L1) shortens as shown in FIG. 6(C), i.e. the distance resolution increases. Meanwhile, it can be seen that as the light emission time and the exposure time lengthen as shown in FIG. 6(B), the imaging object length (L2−L1) lengthens as shown in FIG. 6(D), i.e. the distance resolution decreases. Therefore, by making the resolution of target distance finer as the light emission time and the exposure time shorten, it is possible to improve the accuracy of distance detection. However, since the luminance of images which are acquired becomes lower as the light emission time and the exposure time shorten, object recognition becomes difficult.

For this reason, from a comprehensive perspective on the above-described circumstances, the inventors of this application have found a technology for improving the accuracy of recognition of objects in a range of a specific distance necessary for object recognition by imaging only the range of the specific distance with high luminance (bright). Hereinafter, a method for imaging only a range of a specific distance with high luminance will be described.

Figure 7:
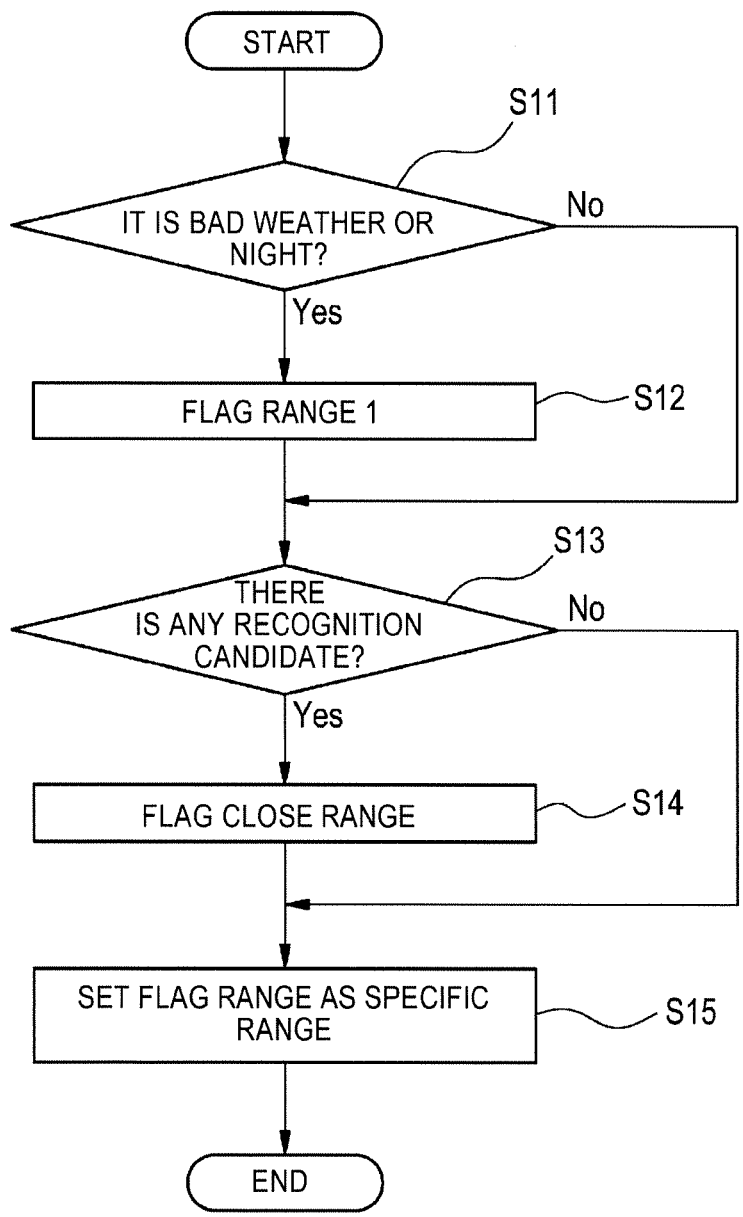
FIG. 7 is a flow chart illustrating a process of determining a range of a specific distance according to a first example.
Figure 8:
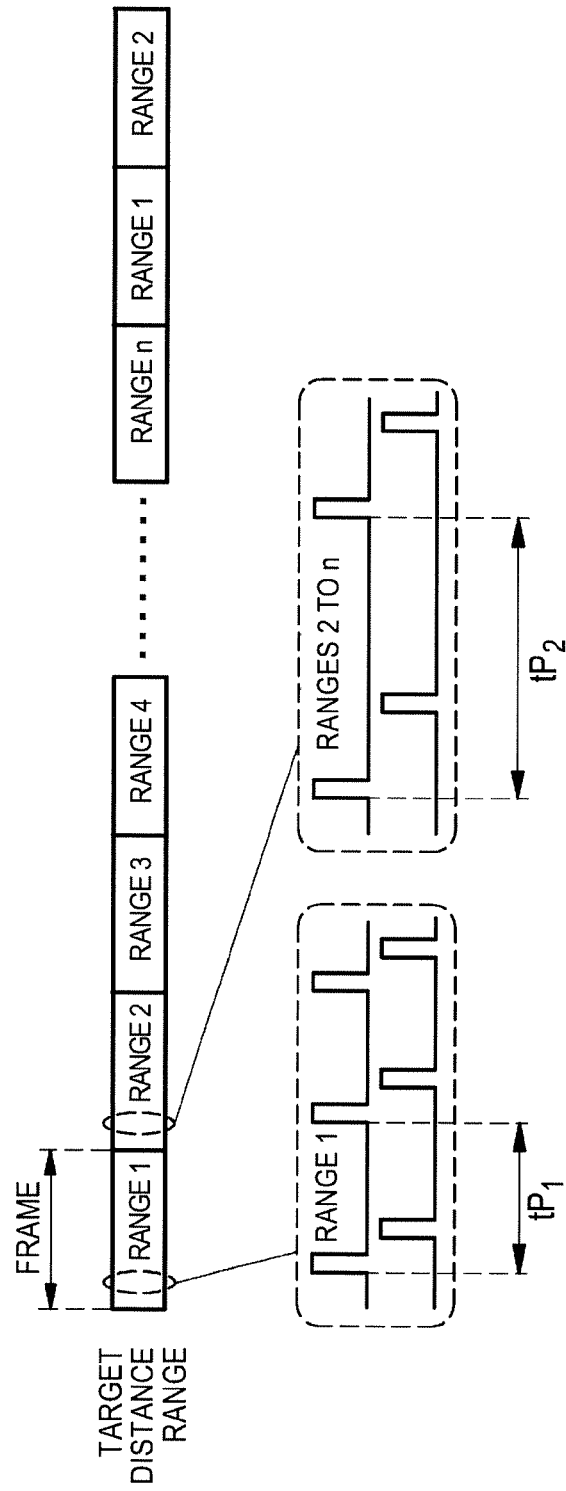
FIG. 8 is a view illustrating a light emission cycle and imaging timings according to the first example.

FIG. 7 is a flow chart for determining a range of a specific distance according to a first example. FIG. 8 is a view illustrating the temporal relationship between a light emission cycle and imaging timings according to the first example.

In STEP S11, the timing controller 9 determines whether the vehicle is running at night or in a poor weather. The timing controller 9 can determine whether the vehicle is running at night or in a poor weather based on information from various switches or sensors (to be described below) installed in the vehicle V. In the case where it is determined in STEP S11 that the vehicle is running at night or in bad weather ("Yes" in STEP S11), the timing controller proceeds to STEP S12. Meanwhile, in the case where it is determined in STEP S11 that the vehicle is not running at night or in bad weather ("No" in STEP S11), the timing controller proceeds to STEP S13.

Bad weather refers to weather which may result in an object recognition mistake when generating distance image data. Specifically, bad weather is weather in which rain, fog, snow, and the like directly obstruct visual recognition of the front or moisture diffusely reflecting light exists on the road or the like. Determination on whether weather is bad is performed based on information from a wiper switch, a fog lamp switch, a raindrop sensor, and the like of the vehicle V. Also, determination on whether it is night is performed based on information from a tail lamp switch, a sensor for automatic lighting, and the like of the vehicle V. Also, a dedicated sensor for determining whether it is night may be installed.

In STEP S12, the timing controller 9 flags the range 1 which is a range closest to the vehicle V, i.e. sets the range 1 as a candidate for a range of the specific distance, and then proceeds to STEP S13.

In STEP S13, the timing controller 9 determines whether each target distance range (the ranges 1 to n) includes any range from which a recognition candidate object is detected. Detection on recognition candidate objects may be performed by image acquisition of the image acquiring apparatus 2, or detection may be performed in advance by other sensors. In the case where it is determined in STEP S13 that there is a range from which a recognition candidate object is detected ("Yes" in STEP S13), the timing controller 9 proceeds to STEP S14. Meanwhile, in the case where it is determined in STEP S13 that there is no range from which any recognition candidate object is detected ("No" in STEP S13), the timing controller 9 proceeds to STEP S15.

In STEP S14, the timing controller 9 flags a range closest from the vehicle V, for example, the range 1, among ranges from which recognition candidate objects are detected. In other words, the timing controller 9 sets the range 1 as a candidate for a range of the specific distance, and proceeds to STEP S15. Meanwhile, in the case where any recognition candidate object is not detected from the range 1, the timing controller 9 flags a range closest from the vehicle V, among ranges of the ranges 2 to n from which recognition candidate objects are detected.

In STEP S15, the timing controller 9 sets the range flagged in STEP S12 or STEP S14, as a range of the specific distance. That is, in the case where it is bad weather or night, among the target distance ranges, a range closest to the vehicle V is set as a range of the specific distance. Also, among the target distance ranges, a range from which a recognition candidate object is detected is set as a range of the specific distance, and in the case where there is a plurality of ranges from which recognition candidate objects are detected, among the plurality of ranges, a range closest to the vehicle V is set as a range of the specific distance.

Incidentally, the process for determining a range of the specific distance may be performed in the high-speed camera 8, the image processing unit 3, or the like, not in the timing controller 9.

In the first example, the timing controller 9 controls the light emission cycle of pulse light and imaging timings of reflected light such that the range of the specific distance set as described above is imaged with luminance higher than that for ranges other than the range of the specific distance.

For example, in the case where the range 1 which is closest to the vehicle V is set as a range of the specific distance, as shown in FIG. 8, the number of times of emission of pulse light and the number of times of exposure of the high-speed camera for imaging the range 1 are set larger than the number of times of light emission and the number of times of exposure for imaging each of the ranges 2 to n other than the range of the specific distance. For example, a light emission cycle $tP_1$ for the range 1 is set to, for example, $1/150$ ms and a light emission cycle $tP_2$ for the ranges 2 to n is set to $1/100$ ms. That is, if the number of times of light emission and the number of times of exposure for the range 1 of the specific distance are increased, the luminance of pixels of an image of the range 1 becomes higher than the luminance of pixels of images of the ranges 2 to n. Therefore, the luminance difference between the image of the range 1 and images of the ranges 2 to n becomes larger, i.e. the contrast between the image of the range 1 and the images of the ranges 2 to n becomes higher.

Figure 9:
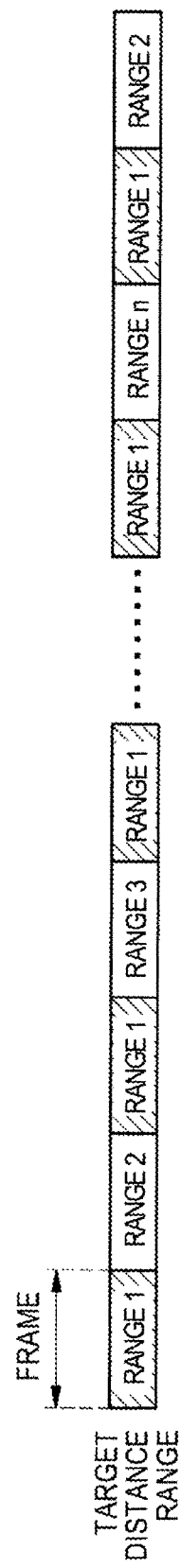
FIG. 9 is a view illustrating the temporal relationship between a light emission cycle and imaging timings according to another example of the first example.

Also, in order to increase the number of times of emission of pulse light and the number of times of exposure of the high-speed camera for imaging the range 1 which is the range of the specific distance, the number of times of range scan of the range 1 may be set larger than the number of times of range scan for imaging the ranges 2 to n other than the range of the specific distance. For example, as shown in FIG. 9, the number of times of range scan of the range 1 can be set larger than the number of times of range scan of the ranges 2 to n such that range scan of the range 1 is performed between range scan of the respective ranges 2 to n. In this way, it is possible to increase the number of times of light emission and the number of times of exposure only for the range 1 of the specific distance, and the luminance of pixels of the image of the range 1 in the distance image data becomes higher than the luminance of pixels of the images of the ranges 2 to n.

According to the image acquiring apparatus 2 of the first example described above, one or more of the following effects may be achieved.

(1) The timing controller 9 of the image acquiring apparatus 2 controls at least one of the light emission cycle of pulse light and the imaging timing of reflected light in order to image the range of the specific distance, necessary for object recognition among different target distance ranges, with luminance higher than that of the ranges other than the range of the specific distance.

Since only the range of the specific distance necessary for object recognition is imaged with high luminance (bright) as described above, the luminance contrast between the image of the range of the specific distance where objects may exist and the images of the ranges other than the range of the specific distance becomes clear. Therefore, recognition of objects in the range of the specific distance becomes easy. Also, since the pulse width and the gate time comparatively short are maintained, it is possible to maintain high (fine) distance resolution. Also, in the ranges other than the range of the specific distance, since the number of times of light emission and the number of times of exposure do not increase, the frame rate does not become higher than necessary, and it is possible to shorten the time required to exhaustively acquire images of all imaging ranges which are imaging objects. As described above, according to the image acquiring apparatus 2 for a vehicle according to the present example, it is possible to improve the accuracy of recognition of objects in images while maintaining fine distance resolution, and thus it is possible to cause improvement in light control and vehicle control.

(2) In the case where it is bad weather or night, according to one or more embodiments of the present invention, a range of the specific distance is the range 1 closest to the vehicle V among the target distance ranges 1 to n. According to this configuration, by bright imaging the range 1 which is closest to the vehicle V and to which most attention should be paid in bad weather or at night, it is possible to improve the accuracy of recognition of objects and contribute to safe driving in rainy weather or at night.

(3) According to one or more embodiments of the present invention, a range of the specific distance is a range from which a recognition candidate object is detected, among the plurality of target distance ranges 1 to n. According to this configuration, by performing detection of objects which are recognition candidates in advance, it is possible to improve the accuracy of recognition of objects.

(4) In the case where there is a plurality of ranges from which recognition candidate objects are detected, according to one or more embodiments of the present invention, a range of the specific distance be set to a range closest to the vehicle V among the plurality of ranges. According to this configuration, in the case where there is a plurality of recognition candidate objects, by bright imaging an object closest to the vehicle V, it is possible to improve the accuracy of recognition of an object to which most attention should be paid.

(5) According to one or more embodiments of the present invention, the timing control unit sets the number of times of light emission of pulse light and the number of times of exposure for the range of the specific distance larger than those for ranges other than the range of the specific distance. According to this configuration, by increasing the number of times of light emission and the number of times of exposure only for the range of the specific distance, it is possible to improve the accuracy of recognition of objects without unnecessarily increasing power consumption and without unnecessarily increasing the frame rate.

SECOND EXAMPLE

Figure 10:
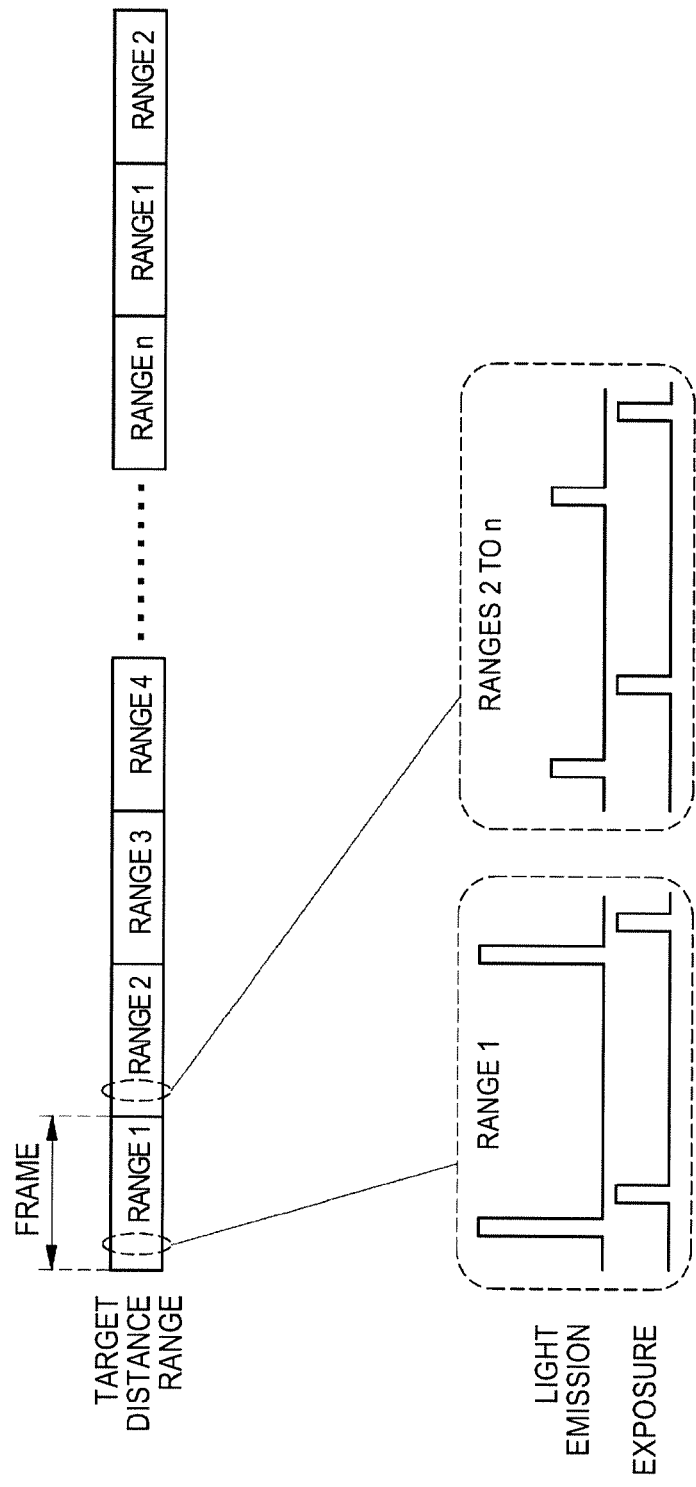
FIG. 10 is a view illustrating the light emission intensity relationship between a range of a specific distance and other ranges.

FIG. 10 is a view illustrating the relationship between a range of a specific distance and other ranges according to second example.

In the second example, for example, in the case where the range 1 which is a range closest from the vehicle V is set as a range of the specific distance, as shown in FIG. 10, the light emitting unit 5 is controlled such that the light emission intensity of pulse light for imaging the range 1 becomes higher than the light emission intensity for imaging the ranges 2 to n other than the range of the specific distance. If the light emission intensity only for the range 1 of the specific distance is increased as described above, the luminance of pixels of an image of the range 1 becomes higher than the luminance of pixels of images of the ranges 2 to n. Therefore, the contrast between the image of the range 1 and the images of the ranges 2 to n becomes high. Also, since the light emission intensity for the ranges 2 to n other than the range of the specific distance is maintained at a comparatively low state, it is possible to improve the accuracy of recognition of objects without unnecessarily increasing power consumption.

THIRD EXAMPLE

Figure 11:
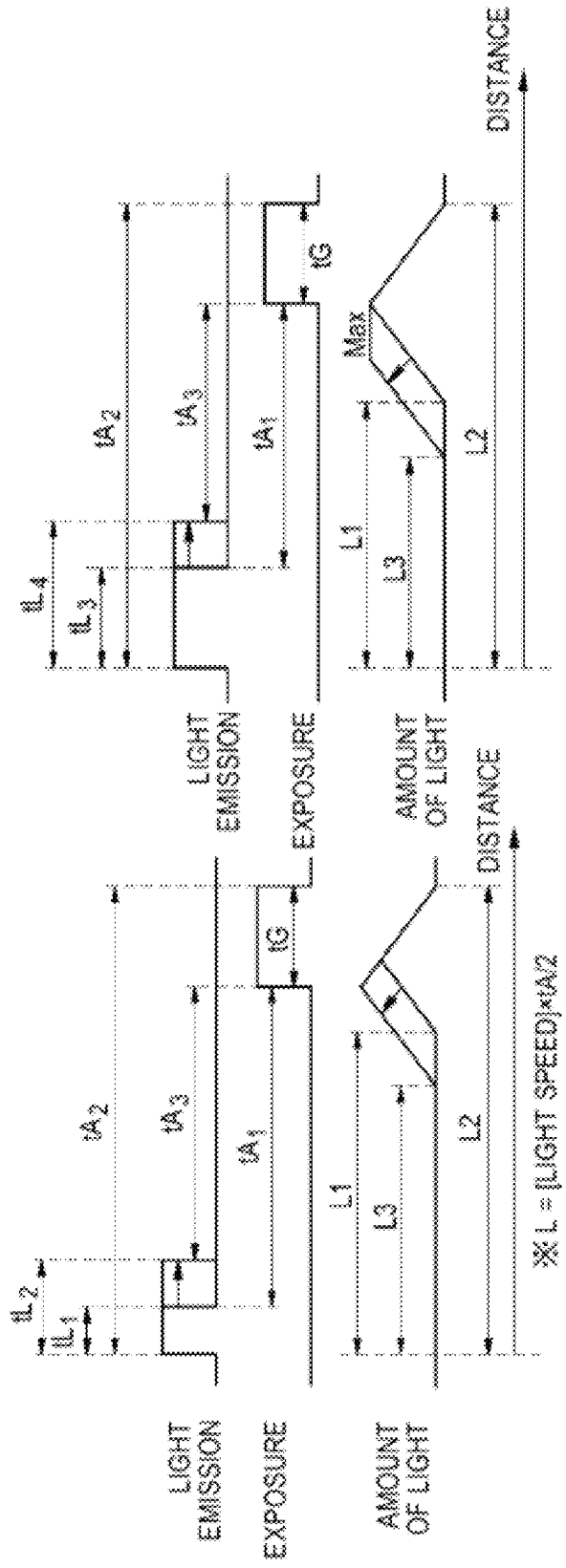
FIGS. 11(A)-11(B) are views illustrating variations in the amount of reflected light and imaging object length in the case of changing light emission time.
Figure 12:
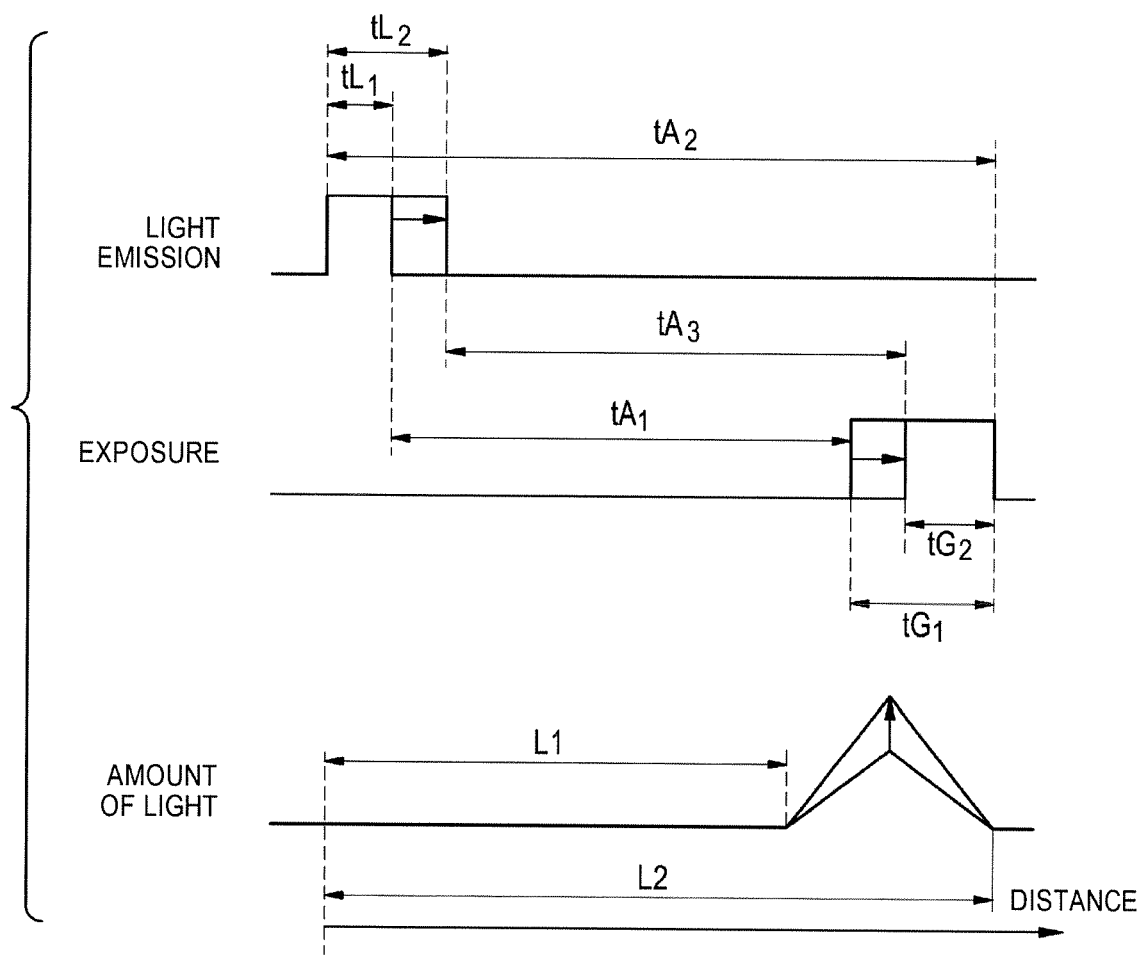
FIG. 12 is a view illustrating the relationship of light emission time and exposure time with the amount of reflected light and distance resolution according to a third example and a sixth example.

FIGS. 11(A) and 11(B) are views illustrating variations in the amount of reflected light and imaging object length in the case of changing light emission time. Also, FIG. 12 is a view illustrating the relationship of light emission time and exposure time with the amount of reflected light and distance resolution according to a third example.

As shown in FIGS. 11(A) and 11(B), by the time $tA_1$ from the light emission end time point to the exposure start (gate opening) time point, a start point L1 of the imaging object distance of an imaging range is determined, and by the time $tA_2$ from the light emission start time point to the exposure end (gate closing) time point, an end point L2 of the imaging object distance is determined.

Here, as shown in FIG. 11(A), from the state where a light emission time $tL_1$ is shorter than the gate time (exposure time) tG, if the light emission time $tL_1$ is lengthened to $tL_2$ ($tL_2 > tL_1$), the peak of the amount of reflected light which can be received to perform exposure rises, and thus it is possible to image objects bright. However, since a time $tA_3$ from the light emission end time point to the exposure start (gate opening) time point becomes short ($tA_1 > tA_3$), a start point L3 of the imaging object distance moves to a position closer to the vehicle V than the point L1 is. In other words, if the light emission time lengthens, the imaging object length lengthens and the distance resolution decreases.

Also, as shown in FIG. 11(B), from the state where a light emission time $tL_3$ is equal to or longer than the gate time (exposure time) tG, if the light emission time $tL_3$ is further lengthened to a time $tL_4$ ($tL_4 > tL_3$), the time when the amount of reflected light which can be received to perform exposure is maintained at the maximum light amount lengthens and it is possible to image objects bright; however, since the time $tA_3$ from the light emission end time point to the exposure start time point shortens, the imaging object distance lengthens and the distance resolution decreases.

For this reason, in the third example, for example, in the case where the range 1 which is a range closest from the vehicle V is set as a range of the specific distance, as shown in FIG. 12, control is performed such that the light emission time of pulse light for imaging the range 1 is lengthened and the exposure time of the high-speed camera 8 for imaging the range 1 is shortened. Specifically, the light emission time $tL_1$ for the range 1 is lengthened to $tL_2$ ($tL_2 > tL_1$) and an exposure time $tG_1$ for the range 1 is shortened to $tG_2$ ($tG_1 > tG_2$). The exposure time tG is shortened by delaying the start time of the exposure time $tG_1$. As described above, by lengthening the light emission time for the range of the specific distance, it is possible to increase the amount of light capable of exposing, thereby bright imaging objects existing in the range of the specific distance. Meanwhile, since the exposure time is shortened by lengthening the light emission time, before and after the light emission time and the exposure time change, the time to from the light emission end time point to the exposure start time point ($tA_1$ to $tA_3$) does not change significantly. Therefore, even though the light emission time is lengthened, the imaging object length does not lengthen.

As described above, by lengthening the light emission time for the range of the specific distance (for example, the range 1) while shortening the exposure time, it is possible to improve the accuracy of recognition of objects while maintaining fine distance resolution.

Next, fourth and fifth examples will be described with reference to FIG. 13 and FIG. 14.

As described above, as the light emission time and the exposure time shorten, it is possible to make the resolution of target distance finer, thereby improving the accuracy of distance detection. However, since the luminance of an image which is acquired becomes lower as the light emission time and the exposure time shorten, it takes more time to exhaustively acquire images of a desired imaging range with high luminance, and the cost of the apparatus increases.

For this reason, from a comprehensive perspective on the above-described circumstances, the inventors of this application have found that it is possible to prevent increase in the time required to exhaustively acquire images of a desired imaging range and the cost while improving the accuracy of recognition of objects by intensively imaging only a target road environment. Hereinafter, a method for intensively imaging only a target road environment will be described.

In the fourth example, a target road environment is, for example, an intersection or a blind curve where accidents are likely to occur. Such target road environments are acquired from map information. In the present example, the image processing unit 3 acquires information on existence or non-existence of target road environments such as an intersection or a curve and the distances from the vehicle V to target road environments, from a navigation system or the like, and a range which should be intensively imaged is determined.

Figure 13:
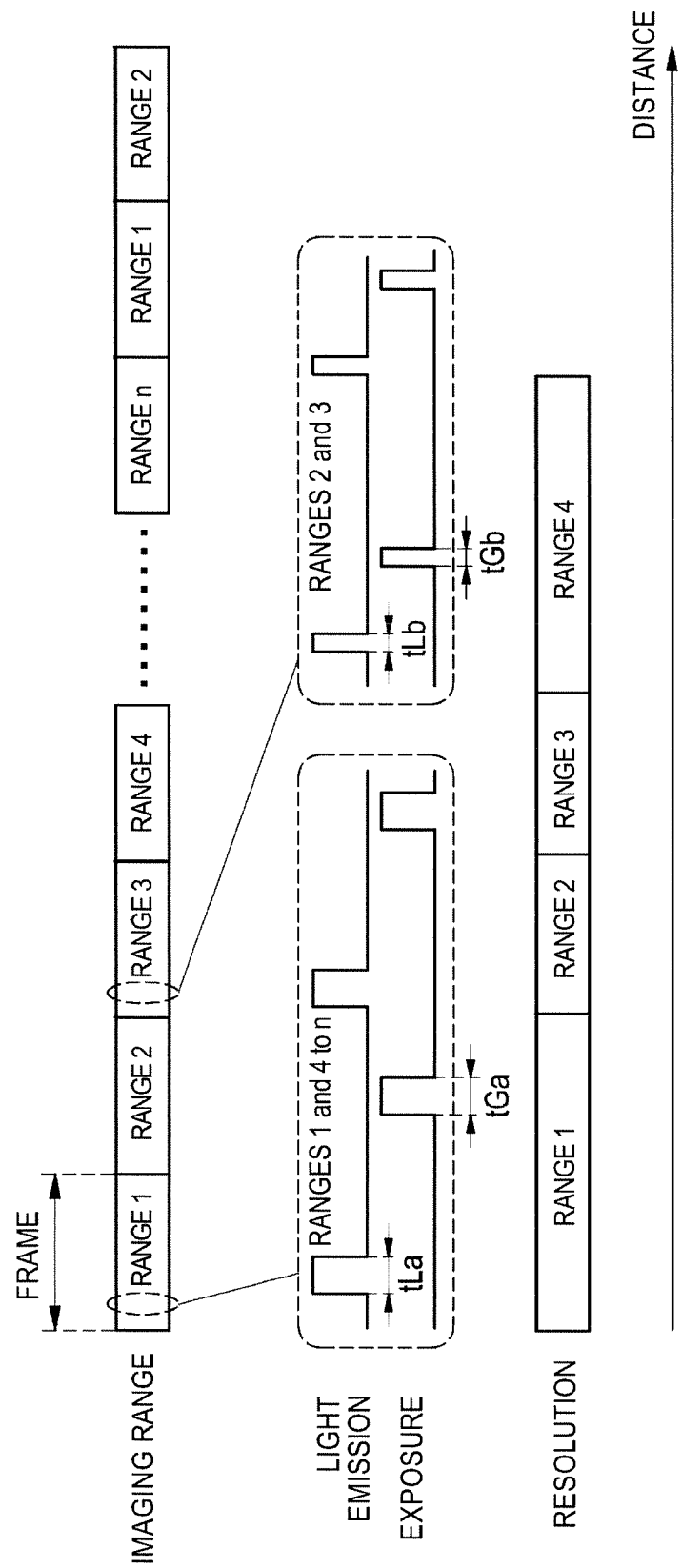
FIG. 13 is a view illustrating a light emission cycle and imaging timings according to a fourth example.

FIG. 13 is a view illustrating the temporal relationship between a light emission cycle and imaging timings according to the fourth example.

In the fourth example, the light emission cycle of pulse light and imaging timings of the high-speed camera 8 are controlled such that a range of a target road environment is imaged more intensively than ranges other than the range of the target road environment.

As shown in FIG. 13, for example, in the case where a target road environment such as an intersection or a curve is set in the ranges 2 and 3 of the ranges 1 to n, the timing controller 9 controls a light emission time tLb of pulse light and a gate opening time (exposure time) tGb of the high-speed camera 8 for imaging the ranges 2 and 3 such that they become shorter than a light emission time tLa and an exposure time tGa for imaging the ranges 1 and 4 to n other than the ranges 2 and 3. By shortening the light emission time and the exposure time only for the ranges 2 and 3 of the target road environment as described above, it is possible to improve the distance resolution of the ranges 2 and 3 as compared to the distance resolution of the ranges 1 and 4 to n.

According to the image acquiring apparatus 2 of the fourth example described above, one or more of the following effects may be achieved.

(6) The timing controller 9 controls at least one of the light emission cycle of pulse light and the imaging timing such that the range of the target road environment determined from among different target distance ranges is imaged more intensively than ranges other than the range of the target road environment. By intensively imaging only the range of the target road environment as described above, it is possible to grasp the distances to objects with high accuracy, and it is possible to prevent increase in the time required to exhaustively acquire images of a desired imaging range and the cost. Also, since the luminance contrast between ranges of target road environments and other ranges becomes clear, recognition of recognition candidate objects in target road environments becomes easy. Therefore, it is possible to cause improvement in light control and vehicle control.

(7) According to one or more embodiments of the present invention, a target road environment includes an intersection or a curve and be acquired by map information.

By acquiring an intersection or a curve where accidents are likely to occur from map information and intensively imaging the intersection or the curve, it is possible to cause suppression of traffic accidents.

(8) According to one or more embodiments of the present invention, the timing controller 9 performs control such that the light emission time of pulse light and the exposure time of the high-speed camera 8 for ranges of target road environments become shorter than those for ranges other than the ranges of the target road environments.

By shortening the light emission time and the exposure time for ranges of target road environments, it is possible to improve the distance resolution of the ranges of the target road environments, and thus it is possible to grasp the distances to objects with high accuracy.

FIFTH EXAMPLE

Figure 14:
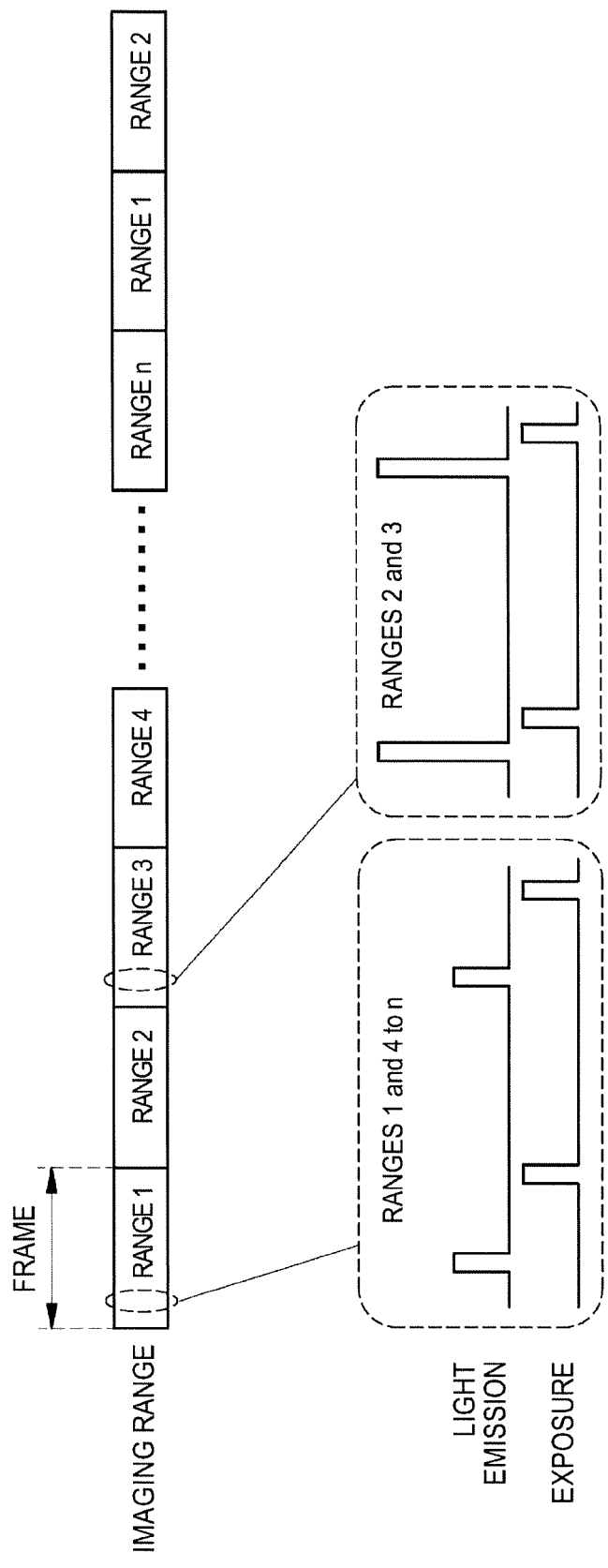
FIG. 14 is a view illustrating the light emission intensity relationship between a range of a specific distance and other ranges according to a fifth example.

FIG. 14 is a view illustrating the light emission intensity relationship between a range of the specific distance and other ranges according to a fifth example.

As shown in FIG. 14, in the fifth example, for example, in the case where the ranges 2 and 3 are set as ranges of a target road environment, the light emitting unit 5 is controlled such that the light emission intensity of pulse light for imaging the ranges 2 and 3 becomes higher than the light emission intensity for imaging the ranges 1 and 4 to n other than the ranges of the target road environment. If the light emission intensity for the ranges 2 and 3 of the target road environment is set higher than that for the ranges 1 and 4 to n other than the ranges of the target road environment as described above, since the luminance of pixels of images of the ranges 2 and 3 becomes higher than the luminance of pixels of images of the other the ranges 1 and 4 to n, it is possible to image only the target road environment intensively and bright. Also, since the light emission intensity for the ranges 1 and 4 to n other than the ranges of the target road environment are maintained at a comparatively low state, it is possible to improve the accuracy of recognition of objects without unnecessarily increasing power consumption.

SIXTH EXAMPLE

A sixth example will be described with reference to FIGS. 11(A)-11(B) and FIG. 12 used in the description of the third example.

As described above, as shown in FIG. 11(A), from the state where the light emission time $tL_1$ is shorter than the gate opening time (exposure time) tG, if the light emission time $tL_1$ is lengthened to $tL_2$ ($tL_2 > tL_1$), the peak of the amount of light which can be received to perform exposure rises, and thus it is possible to image objects bright. However, if the light emission time lengthens, the imaging object length lengthens, and the distance resolution decreases.

Also, as shown in FIG. 11(B), if the light emission time $tL_3$ is further lengthened to the time $tL_4$ ($tL_4 > tL_3$), the time when the amount of reflected light which can be received to perform exposure is maintained at the maximum light amount lengthens and it is possible to image objects bright; however, since the time $tA_3$ from the light emission end time point to the exposure start time point shortens, the imaging object distance lengthens and the distance resolution decreases.

For this reason, in the sixth example, for example, in the case where the ranges 2 and 3 are set as ranges of a target road environment, control is performed such that the light emission time of pulse light for imaging the ranges 2 and 3 is lengthened and the exposure time of the high-speed camera 8 for imaging the ranges 2 and 3 is shortened (see FIG. 12). Specifically, the light emission time tLi for the range 1 is lengthened to $tL_2$ ($tL_2 > tL_1$) and an exposure time $tG_1$ for the range 1 is shortened to $tG_2$ ($tG_1 > tG_2$). The exposure time tG is shortened by delaying the start time of the exposure time $tG_1$. As described above, by lengthening the light emission time for the range of the specific distance, it is possible to increase the amount of light capable of exposing, thereby bright imaging objects existing in the range of the specific distance. Meanwhile, since the exposure time is shortened by lengthening the light emission time, before and after the light emission time and the exposure time change, the time to from the light emission end time point to the exposure start time point ($tA_1$ to $tA_3$) does not change significantly. Therefore, even though the light emission time is lengthened, the imaging object length does not lengthen, i.e. the distance resolution does not deteriorate.

As described above, by lengthening the light emission time for ranges of the specific distance (for example, the ranges 2 and 3) which should be intensively imaged while shortening the exposure time, it is possible to improve the accuracy of recognition of objects while maintaining fine distance resolution.

Next, seventh and eight examples will be described with reference to FIGS. 15(A) to 20.

As described above, as the light emission time and the exposure time shorten, it is possible to make the resolution of target distance finer, thereby improving the accuracy of distance detection. Although it is desirable that it be possible to bright image all of target distance ranges (for example, 0 m to 200 m in front of the vehicle) which are desired distance ranges with fine distance resolution, as the distance resolution decreases, it takes more time required to exhaustively acquire images of the target distance ranges, and the cost of the apparatus increases.

For this reason, from a comprehensive perspective on the above-described circumstances, the inventors of this application have found that by intensively imaging desired ranges where objects (subjects) exist among target distance ranges, it is possible to prevent increase in the time required to exhaustively acquire images of the desired imaging ranges and the cost while improving the accuracy of recognition of objects in the desired ranges. Hereinafter, a method for intensively imaging desired ranges will be described.

SEVENTH EXAMPLE

FIGS. 15(A)-15(B) are views illustrating an object search method according to the seventh example.

In the seventh example, the timing controller 9 (an example of a search process control unit) performs a search process sequence of searching existence or non-existence of objects in front of the vehicle, before the image acquiring process described above. As shown in FIGS. 15(A)-15(B), in the search process sequence, a search frame for roughly searching existence or non-existence of objects and the distances to objects, and an imaging frame for acquiring images by imaging predetermined target distance ranges changing continuously are provided, and the search frame is disposed before the imaging frame. The search frame includes a plurality of times of search (search 1 to search n). The imaging frame includes imaging of the overall imaging range of the ranges 1 to n. One search frame can be provided with respect to one imaging frame or with respect to a plurality of imaging frames. In other words, as shown in FIG. 15(A), it is possible to perform search frames and imaging frames one by one alternately by first performing a search frame of search 1 and search n and performing an imaging frame and then performing a search frame again. Also, as shown in FIG. 15 (B), with respect to performance of a plurality of imaging frames 1 to n, one search frame may be performed by first performing a search frame and performing the plurality of imaging frames from the imaging frame 1 to the imaging frame n and then performing a search frame again. As described above, in the seventh example, the timing controller 9 can control the light emission cycle of pulse light of the light emitting unit 5 and imaging timings of the high-speed camera 8 such that a search frame which is a step of searching existence or non-existence of objects is provided before an imaging frame including a step of outputting pulse light and a step of imaging reflected light.

Figure 17:
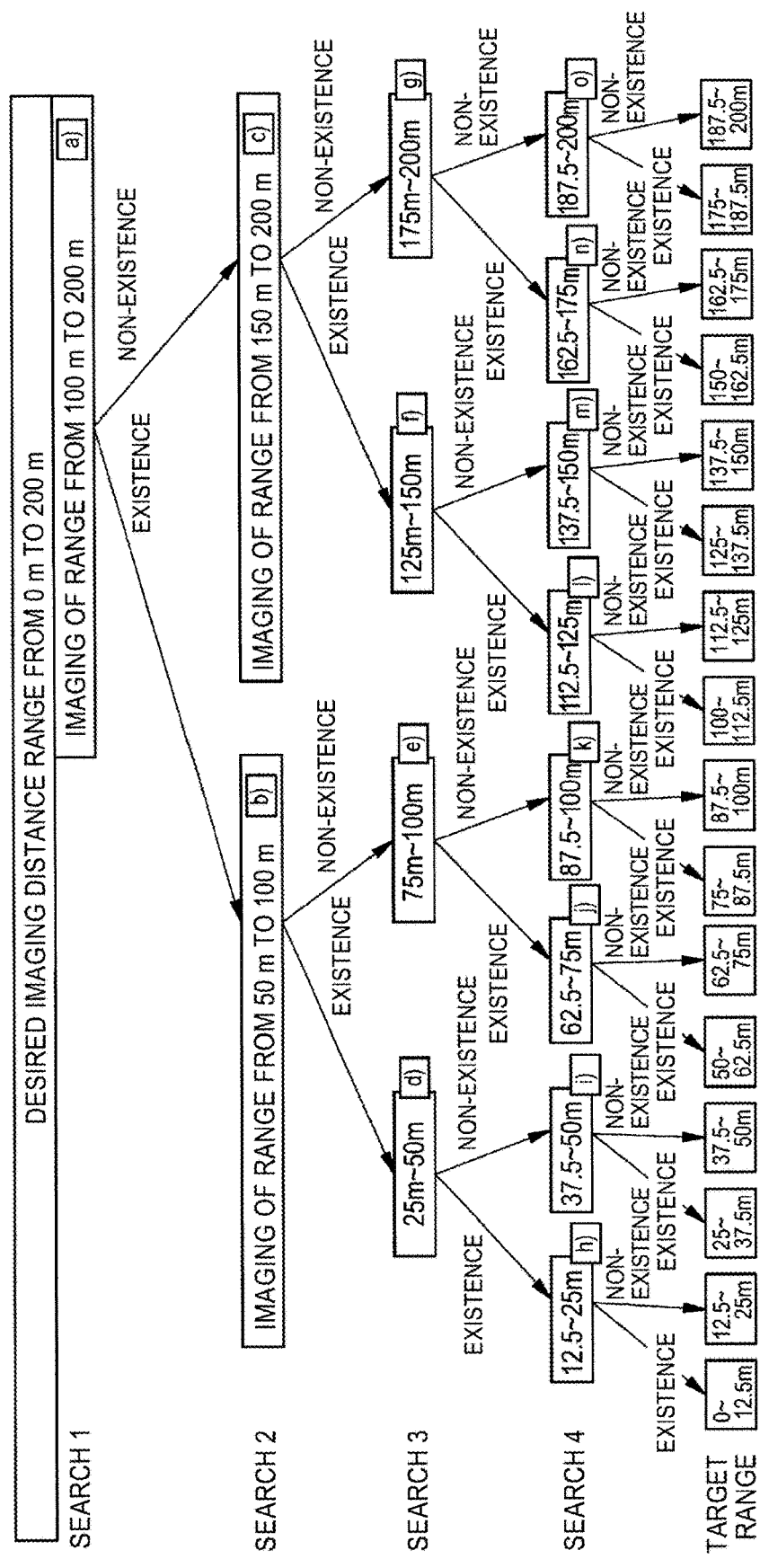
FIG. 17 is a view illustrating a sequence process for search distance determination according to the seventh example.

FIGS. 16(A)-16(B) show schematic diagrams of imaging of a specific distance and acquired images. Specifically, FIG. 16(A) shows a schematic diagram of the case where there is no object at a distance shorter than the specific distance, and an acquired image, and FIG. 16(B) shows a schematic diagram of the case where there is an object at a distance shorter than the specific distance, and an acquired image. Also, FIG. 17 is a view illustrating a sequence process for search distance determination according to the seventh example.

FIGS. 16(A)-16(B) are views illustrating the case where there is a plurality of objects at different distances from the vehicle in the same direction in front of the vehicle. In the example of FIGS. 16(A)-16(B), sequentially from the near side, a doll 1, a doll 2, and a wall exist. In FIG. 16(A), at such a timing that the peak of luminance is positioned in a range where the doll 1 exists, imaging is performed. Meanwhile, in FIG. 16(B), at such a timing when the peak of luminance is positioned in a range between the doll 2 and the wall, imaging is performed.

In the case of FIG. 16(A), since there is no object nearer than the doll 1, an image from which it is possible to visually recognize the doll 1 and the doll 2 is acquired. Meanwhile, in the case of FIG. 16(B), since there is the doll 1 at a distance shorter than an imagable distance (a triangular area representing luminance), an image in which pixels of the area where there is the doll 1 are black (luminance values are zero) is acquired.

In one or more embodiments of the present invention, by performing the search process sequence such that search starts from a range farthest from the vehicle while taking advantage of the above-mentioned features, a search object range is determined. Specifically, in the case where a distance range (a target distance range) which is a desired imaging object is 0 m to 200 m in front of the vehicle, search processes from search 1 to search 4 shown in FIG. 17 are performed.

(Search 1)

First, the timing controller 9 controls the high-speed camera 8 such that the high-speed camera images a range a (from 100 m to 200 m) which is a range far from the vehicle among target distance ranges (0 m to 200 m). Then, in the case where the image of the range a has a black pixel area, the timing controller 9 controls the high-speed camera 8 such that the high-speed camera images a range b (50 m to 100 m) far from the vehicle among ranges (0 m to 100 m) closer than the range a is. Meanwhile, in the case where the image of the range a does not include any black pixel area, the timing controller 9 controls the high-speed camera 8 such that the high-speed camera images a range c (50 m to 100 m) which is a range of the range a far from the vehicle. Also, determination on whether there is any black pixel area can be performed based on the sizes and shapes of pixel areas having luminance lower than a threshold.

(Search 2)

Next, based on the result of the search 1, the timing controller 9 performs an imaging process of any one of ranges d to g.

In the case where the image acquired by imaging the range b has a black pixel area, the timing controller 9 controls the high-speed camera 8 such that the high-speed camera images the range d (25 m to 50 m) which is a range far from the vehicle among ranges (0 m to 50 m) closer than the range b is. Meanwhile, in the case where the image of the range b does not have any black pixel area, the timing controller 9 controls the high-speed camera 8 such that the high-speed camera images the range e (75 m to 100 m) which is a range of the range b far from the vehicle.

In the case where the image acquired by imaging the range c has a black pixel area, the timing controller 9 controls the high-speed camera 8 such that the high-speed camera images the range f (125 m to 150 m) which is a range included in a range (100 m to 150 m) of the range a far from the vehicle and is closer than the range c is. Meanwhile, in the case where the image of the range c does not have any black pixel area, the timing controller 9 controls the high-speed camera 8 such that the high-speed camera images the range g (175 m to 200 m) which is a range of the range c far from the vehicle.

(Search 3)

Next, based on the result of the search 2, the timing controller 9 performs an imaging process of any one of ranges h to k.

In the case where an image acquired by imaging the range d has a black pixel area, the timing controller 9 controls the high-speed camera 8 such that the high-speed camera images the range h (12.5 m to 25 m), which is a range included in a range (0 m to 25 m) closer than the range d and far from the vehicle. Meanwhile, in the case where the image of the range d does not have any black pixel area, the timing controller 9 controls the high-speed camera 8 such that the high-speed camera images the range i (37.5 m to 50 m) which is a range of the range d far from the vehicle.

In the case where an image acquired by imaging the range e has a black pixel area, the timing controller 9 controls the high-speed camera 8 such that the high-speed camera images the range j (62.5 m to 75 m), which is a range included in a range (50 m to 75 m) of the range b closer than the range e and far from the vehicle. Meanwhile, in the case where the image of the range e does not have any black pixel area, the timing controller 9 controls the high-speed camera 8 such that the high-speed camera images the range k (87.5 m to 100 m) which is a range of the range e far from the vehicle.

In the case where the image acquired by imaging the range f has a black pixel area, the timing controller 9 controls the high-speed camera 8 such that the high-speed camera images a range l (112.5 m to 125 m) which is a range included in a range (100 m to 125 m) of the range a closer than the range f and far from the vehicle. Meanwhile, in the case where the image of the range f does not have any black pixel area, the timing controller 9 controls the high-speed camera 8 such that the high-speed camera images a range m (137.5 m to 150 m) which is a range of the range f far from the vehicle.

In the case where the image acquired by imaging the range g has a black pixel area, the timing controller 9 controls the high-speed camera 8 such that the high-speed camera images a range n (162.5 m to 175 m), which is a range included in a range (150 m to 175 m) of the range c closer than the range g is and far from the vehicle. Meanwhile, in the case where the image of the range g does not have any black pixel area, the timing controller 9 controls the high-speed camera 8 such that the high-speed camera images the range o (187.5 m to 200 m) which is a range of the range g far from the vehicle.

(Search 4)

Finally, based on the result of the search 3, the timing controller 9 determines a range where there is an object.

In the case where the image acquired by imaging the range h (12.5 m to 25 m) has a black pixel area, the timing controller 9 determines that an object exits in the range from 0 m to 12.5 m. Meanwhile, in the case where the image acquired by imaging the range h does not have any black pixel area, the timing controller 9 determines that an object exists in the range from 12.5 m to 25 m.

In the case where the image acquired by imaging the range i (37.5 m to 50 m) has a black pixel area, the timing controller 9 determines that an object exists in the range from 25 m to 37.5 m. Meanwhile, in the case where the image acquired by imaging the range i does not have any black pixel area, the timing controller 9 determines that an object exists in the range from 37.5 m to 50 m.

In the case where the image acquired by imaging the range j (62.5 m to 75 m), the timing controller 9 determines that an object exists in the range from 50 m to 62.5 m. Meanwhile, in the case where the image acquired by imaging the range j does not have any black pixel area, the timing controller 9 determines that an object exists in the range from 62.5 m to 75 m.

In the case where the image acquired by imaging the range k (87.5 m to 100 m) has a black pixel area, the timing controller 9 determines that an object exists in the range from 75 m to 87.5 m. Meanwhile, in the case where the image acquired by imaging the range k does not have any black pixel area, the timing controller 9 determines that an object exists in the range from 87.5 m to 100 m.

In the case where the image acquired by imaging the range l (112.5 m to 125 m) has a black pixel area, the timing controller 9 determines that an object exists in the range from 100 m to 112.5 m. Meanwhile, in the case where the image acquired by imaging the range l does not have any black pixel area, the timing controller 9 determines that an object exists in the range from 112.5 m to 125 m.

In the case where the image acquired by imaging the range m (137.5 m to 150 m) has a black pixel area, the timing controller 9 determines that an object exists in the range from 125 m to 137.5 m. Meanwhile, in the case where the image acquired by imaging the range m does not have any black pixel area, the timing controller 9 determines that an object exists in the range from 137.5 m to 150 m.

In the case where the image acquired by imaging the range n (162.5 m to 175 m) has a black pixel area, the timing controller 9 determines that an object exists in the range from 150 m to 162.5 m. Meanwhile, in the case where the image acquired by imaging the range n does not have any black pixel area, the timing controller 9 determines that an object exists in the range from 162.5 m to 175 m.

In the case where the image acquired by imaging the range o (187.5 m to 200 m) has a black pixel area, the timing controller 9 determines that an object exists in the range from 175 m to 187.5 m. Meanwhile, in the case where the image acquired by imaging the range o does not have any black pixel area, the timing controller 9 determines that an object exists in the range from 187.5 m to 200 m.

In the above-mentioned search process sequence, for example, in the case where it is determined in all of the search 1 to the search 4 that there is a black pixel area, it is determined that an object exists in the range from 0 m to 12.5 m. Also, for example, in the case where it is determined in the search 1 that there is no black pixel area, and it is determined in the search 2 that there is a black pixel area, and it determined in the search 3 that there is no black pixel area, and it is determined in the search 4 that there is a black pixel area, it is determined that an object exists in the range from 125 m to 137.5 m.

As described above, in the search process sequence according to the seventh example, it is possible to search an object existing at the shortest distance from the vehicle with a distance resolution of 12.5 m by search of four frames.

In the search process sequence using search frames, if a range of an object existing at the shortest distance from the vehicle is determined, the timing controller 9 performs control such that the range where the object exists is intensively imaged. Specifically, as shown in FIGS. 18(A) to 18(C), for example, in the case where a range where an object exists is the range 1 of the ranges 1 to n, by setting the number of times of light emission and the number of times of exposure for the range 1 larger than those for the other the ranges 2 to n, or setting the light emission intensity for the range 1 higher than the light emission intensity for the ranges 2 to n, or setting the light emission time for the range 1 longer than the exposure time, it is possible to intensively image the range 1. Also, with respect to the ranges 2 to n where the object existing at the shortest distance does not exist, in order to reduce the time required to generate distance image data and the cost, control is performed such that the number of times of light emission and the exposure time are not unnecessarily increased and the light emission intensity is not unnecessarily increased.

According to the image acquiring apparatus 2 of the seventh example and the image acquiring method which is performed by the corresponding apparatus, one or more of the following effects may be achieved.

(9) The timing controller 9 performs the step of searching existence or non-existence of objects before performing the step of acquiring images by emitting pulse light and imaging reflected light of the pulse light. As described above, since the step of searching existence or non-existence of objects in advance is provided, in the step of acquiring images, it is possible to intensively image a distance range where an object exists among the target distance ranges. Therefore, it is possible to improve the accuracy of object recognition while preventing increase in the time required to exhaustively acquire images of the target distance ranges and the cost.

(10) In the step of searching existence or non-existence of objects, according to one or more embodiments of the present invention, a search frame for searching existence or non-existence of objects and the distances to objects is provided before an imaging frame for imaging predetermined distance ranges changing continuously. According to this configuration, it is possible to search existence or non-existence of objects before the image acquiring process by an easy method.

(11) According to one or more embodiments of the present invention, the step of searching existence or non-existence of objects includes a step of detecting the distance of an object closest from the vehicle by dividing a target distance range into a close range close to the vehicle and a far range far from the vehicle, and setting the far range as a first search range, determining whether an image of the far range by imaging reflected light from the far range includes a predetermined image area, and determining the next search range according to existence or non-existence of the predetermined image area. According to this configuration, it is possible to search an object existing at the shortest distance by a small number of frames.

(12) According to one or more embodiments of the present invention, the predetermined image area is a pixel area having a luminance value equal to or smaller than a threshold. According to this configuration, it is possible to search existence or non-existence of objects by a simple process.

EIGHTH EXAMPLE

Figure 19:
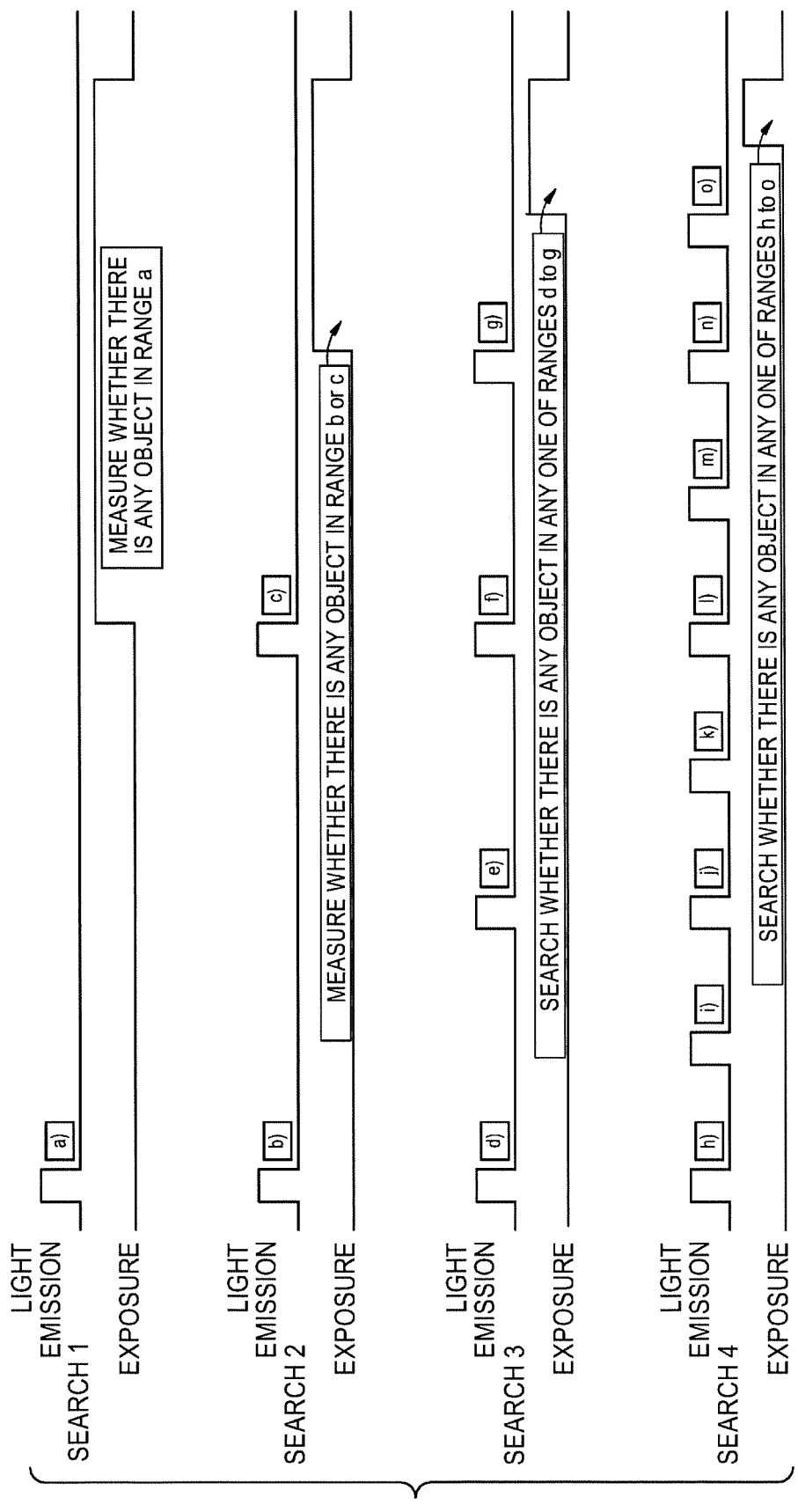
FIG. 19 is a view illustrating a sequence process for search distance determination according to an eighth example.

FIG. 19 is a view illustrating a sequence process for search distance determination according to an eighth example.

In the eighth example, similarly to the seventh example, for example, 0 m to 200 m in front of the vehicle is set as a distance range (a target distance range) which is a desired imaging object.

(Search 1)

As shown in FIG. 19, first, the timing controller 9 controls the light emitting unit 5 such that the light emitting unit emits light once, and performs exposure (a gate opening/closing operation) once. To perform exposure once, the exposure timing and the exposure time are controlled such that it is possible to image the range a (100 m to 200 m) which is a range far from the vehicle. Further, as search 1, the timing controller 9 detects existence or non-existence of a black pixel area in the image of the range a (100 m to 200 m), thereby determining whether there is any object in the range a.

(Search 2)

Next, the timing controller 9 controls the light emitting unit 5 such that the light emitting unit emits light twice, and performs exposure (a gate opening/closing operation) once. To perform exposure once, the exposure timing and the exposure time are controlled such that it is possible to receive reflected light according to light emission performed twice, thereby imaging the range b (50 m to 100 m) and the range c (150 m to 200 m). Subsequently, as search 2, the timing controller 9 detects existence or non-existence of a black pixel area in the images of the range b (50 m to 100 m) and the range c (150 m to 200 m), thereby determining whether there is any object in the range b or the range c.

(Search 3)

Next, the timing controller 9 controls the light emitting unit 5 such that the light emitting unit emits light four times, and performs exposure (a gate opening/closing operation) once. To perform exposure once, the exposure timing and the exposure time are controlled such that it is possible to receive reflected light according to light emission performed four times, thereby imaging the range d (25 m to 50 m), the range e (75 m to 100 m), the range f (125 m to 150 m), and the range g (175 m to 200 m). Subsequently, as search 3, the timing controller 9 detects existence or non-existence of a black pixel area in the images of the range d (25 m to 50 m), the range e (75 m to 100 m), the range f (125 m to 150 m), and the range g (175 m to 200 m), thereby determining whether there is any object in any one of the ranges d to g.

(Search 4)

Next, the timing controller 9 controls the light emitting unit such that the light emitting unit emits light eight times, and performs exposure (a gate opening/closing operation) once. To perform exposure once, the exposure timing and the exposure time are controlled such that it is possible to image the range h (12.5 m to 25 m), the range i (37.5 m to 50 m), the range j (62.5 m to 75 m), the range k (87.5 m to 100 m), the range l (112.5 m to 125 m), the range m (137.5 m to 150 m), the range n (162.5 m to 175 m), and the range o (187.5 m to 200 m). Subsequently, as search 4, the timing controller 9 detects existence or non-existence of a black pixel area in the images of the range h (12.5 m to 25 m), the range i (37.5 m to 50 m), the range j (62.5 m to 75 m), the range k (87.5 m to 100 m), the range l (112.5 m to 125 m), the range m (137.5 m to 150 m), the range n (162.5 m to 175 m), and the range o (187.5 m to 200 m), thereby determining whether there is any object in any one of the ranges h to o.

In the search process sequence according to the eighth example, in the case where it is determined in all of the search 1 to the search 4 that there is a black pixel area, it is determined that an object exists in the range from 0 m to 12.5 m. Also, for example, in the case where it is determined in the search 1 that there is no black pixel area, and it is determined in the search 2 that there is a black pixel area, and it determined in the search 3 that there is no black pixel area, and it is determined in the search 4 that there is a black pixel area, it is determined that an object exists in the range from 125 m to 137.5 m.

As described above, in the search process sequence according to the eighth example, it is possible to search an object existing at the shortest distance from the vehicle with a distance resolution of 12.5 m by search of four frames.

Figure 20:
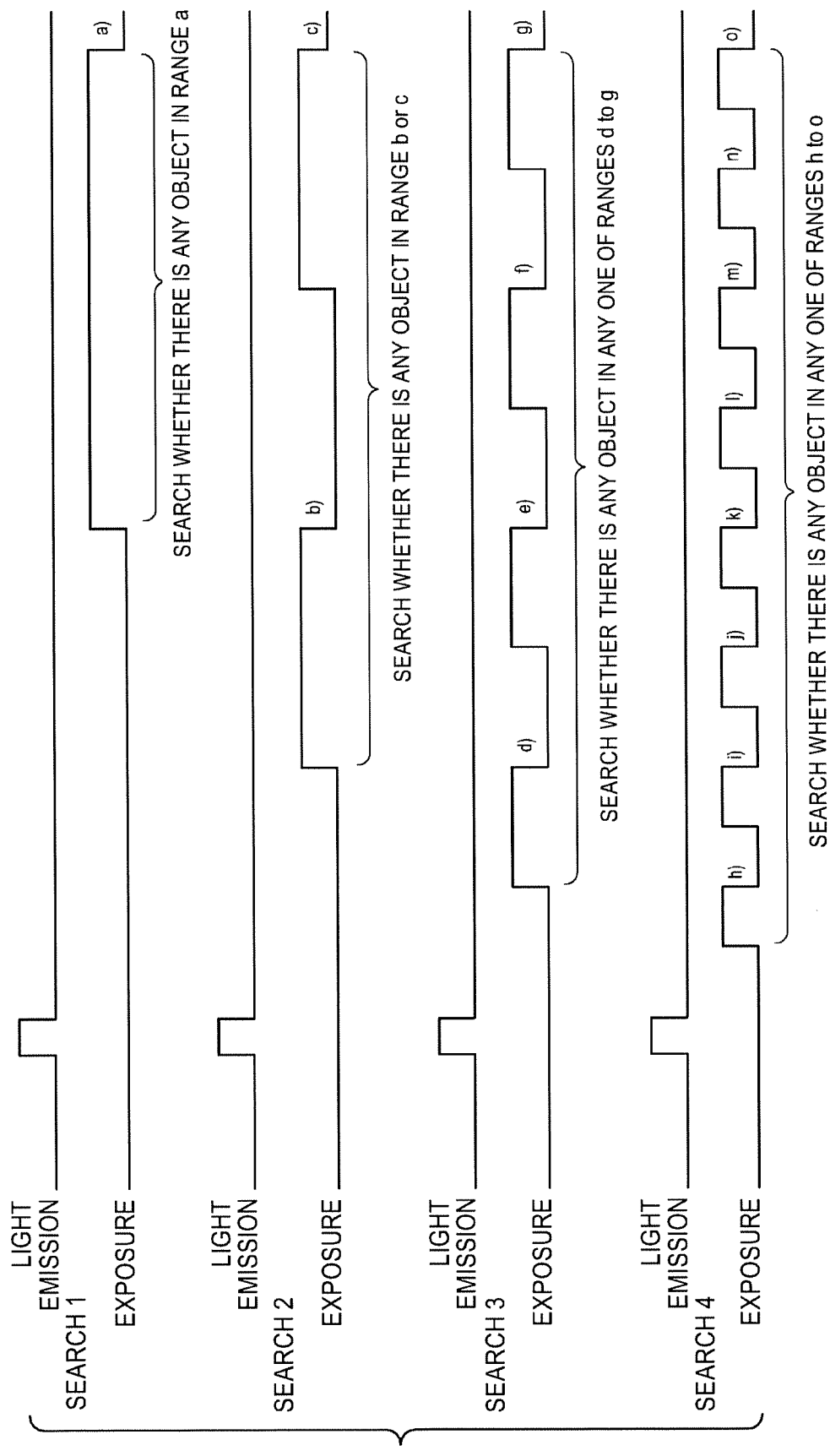
FIG. 20 is a view illustrating a sequence process for search distance determination according to another example of the eighth example.

Also, in the configuration of the eighth example shown in FIG. 19, a range where an object exists is measured by imaging light emitted a plurality of times by performing exposure once; however, this disclosure is not limited to this configuration. For example, as shown in FIG. 20, when light emission is performed once, according to a search object range, a plurality of times of exposure may be performed to measure a range where an object exists. Even according to the sequence process shown in FIG. 20, it is possible to search an object existing at the shortest distance from the vehicle by search of four frames.

In the eighth example described above, in order to search existence or non-existence of objects, a distance range where an object exists is narrowed down by emitting pulse light a plurality of times and imaging reflected light a plurality of times. According to this configuration, similarly to the seventh example, it is possible to search an object existing at the shortest distance by a small number of frames.

Although the embodiments of this disclosure has been described based on the examples, the specific configuration of this disclosure is not limited to the configurations of the examples, and design change, addition, and so on are allowed unless they depart the gist of the inventions according to claims.

For example, the imaging object length, the amount of change in the imaging object distance, the number of frames for each target distance range, and so on can be appropriately set according to the performance of the high-speed camera 8 and the image processing unit 3.

In one or more of the above-described embodiments, as shown in FIG. 1, the high-speed camera 8 functions as an image acquisition unit; however, this disclosure is not limited to this example. For example, the image processing unit 3 may have the function of an image acquisition unit, or a separate memory for storing images may be provided as an image acquisition unit between the high-speed camera 8 and the image processing unit 3.

In one or more of the above-described embodiments, as shown in FIG. 1, the light intensifying unit 7 (the gate 7a and the image intensifier 7b) is installed between the objective lens 6 and the high-speed camera 8; however, this disclosure is not limited to this example. For example, without installing the light intensifying unit 7, it is possible to acquire a plurality of images by performing gating in the high-speed camera 8 at predetermined imaging timings.

In one or more of the above-described embodiments, object recognition is performed by generating distance image data by the image processing unit 3; however, object recognition may be performed from images of respective target distances acquired by the high-speed camera 8.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An image acquiring apparatus for a vehicle, comprising:
    a light emitting unit configured to emit pulse light to a predetermined direction;
    an image acquisition unit configured to acquire a plurality of different images of target distance ranges by imaging reflected light returning from the target distance ranges at imaging timings set according to the target distance ranges; and
    a timing controller configured to control a light emission cycle of the pulse light and the imaging timings,
    wherein the timing controller is configured to control at least one of the light emission cycle and the imaging timing such that among different target distance ranges, a range of a specific distance necessary for object recognition is imaged with luminance higher than that for ranges other than the range of the specific distance,
    wherein the range of the specific distance is a range closest to the image acquisition unit among the target distance ranges or a range from which a recognition candidate object is detected among the target distance ranges, and
    wherein a number of light emission times and a number of exposure times for the range of the specific distance are set to be greater than those times set for the other ranges.

2. The image acquiring apparatus according to claim 1, wherein during bad weather or night, the range of the specific distance is the range closest to the image acquisition unit among the target distance ranges.

3. The image acquiring apparatus according to claim 1, wherein when a plurality of ranges exist from which the recognition candidate object is detected, the range of the specific distance is set to a range closest to the image acquisition unit among the plurality of ranges.

4. The image acquiring apparatus according to claim 1, wherein the light emitting unit is controlled such that a light emission intensity of the pulse light for the range of the specific distance becomes higher than that for the ranges other than the range of the specific distance.

5. The image acquiring apparatus according to claim 1, wherein the timing controller is configured to lengthen a light emission time of the pulse light while shortening an exposure time of the image acquisition unit for the range of the specific distance as compared to the ranges other than the range of the specific distance.

6. A vehicle comprising:
    the image acquiring apparatus according to claim 1.

7. The image acquiring apparatus according to claim 1, wherein the image acquisition unit detects, among the target distance ranges, the range of the specific distance.

8. The image acquiring apparatus according to claim 7, wherein the range of the specific distance is detected when:
    a target road environment is found in the range; or
    a target object is found in the range.

9. A control device for controlling an image acquiring apparatus for a vehicle,
    wherein the vehicle comprises:
        a light emitting unit configured to emit pulse light to a predetermined direction, and
        an image acquisition unit configured to acquire a plurality of different images of target distance ranges by imaging reflected light returning from the target distance ranges at imaging timings set according to the target distance ranges, and
    wherein the control device comprises:
        a controller configured to control at least one of a light emission cycle of the pulse light and the imaging timings such that a range of a specific distance necessary for object recognition among different target distance ranges is imaged with luminance higher than that for ranges other than the range of the specific distance,
    wherein the range of the specific distance is a range closest to the image acquisition unit among the target distance ranges or a range from which a recognition candidate object is detected among the target distance ranges, and
    wherein a number of light emission times and a number of exposure times for the range of the specific distance are set to be greater than those times set for the other ranges.

10. The control device according to claim 9, wherein the controller detects, among the target distance ranges, the range of the specific distance.

11. The control device according to claim 10, wherein the range of the specific distance is detected when:
    a target road environment is found in the range; or
    a target object is found in the range.

12. An image acquiring method for a vehicle, comprising:
    acquiring a plurality of different images of target distance ranges by imaging reflected light of pulse light emitted to a predetermined direction while changing imaging timings; and
    controlling at least one of a light emission cycle of the pulse light and the imaging timings such that a range of a specific distance necessary for object recognition among different target distance ranges is imaged with luminance higher than that for ranges other than the range of the specific distance,
    wherein the range of the specific distance is a range closest to the image acquisition unit among the target distance ranges or a range from which a recognition candidate object is detected among the target distance ranges, and wherein a number of light emission times and a number of exposure times for the range of the specific distance are set to be greater than those times set for the other ranges.

13. The image acquiring method according to claim 12, further comprising: detecting, among the target distance ranges, the range of the specific distance.

14. The image acquiring method according to claim 13, wherein the range of the specific distance is detected when:
   a target road environment is found in the range; or
   a target object is found in the range.

* * * * *